US012004225B2

(12) United States Patent
Zhou et al.

(10) Patent No.: US 12,004,225 B2
(45) Date of Patent: Jun. 4, 2024

(54) INITIAL ACCESS RANDOM ACCESS OCCASION-CAUSED INTERFERENCE

(71) Applicant: QUALCOMM Incorporated, San Diego, CA (US)

(72) Inventors: Yan Zhou, San Diego, CA (US); Qian Zhang, Basking Ridge, NJ (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/570,873

(22) Filed: Jan. 7, 2022

(65) Prior Publication Data

US 2023/0224969 A1    Jul. 13, 2023

(51) Int. Cl.
| | |
|---|---|
| *H04W 74/08* | (2009.01) |
| *H04L 5/00* | (2006.01) |
| *H04L 5/16* | (2006.01) |
| *H04W 74/00* | (2009.01) |
| *H04W 74/0833* | (2024.01) |
| *H04W 88/10* | (2009.01) |

(52) U.S. Cl.
CPC ....... *H04W 74/0833* (2013.01); *H04L 5/0051* (2013.01); *H04L 5/16* (2013.01); *H04W 74/004* (2013.01); *H04W 88/10* (2013.01)

(58) Field of Classification Search
CPC ... H04W 88/10; H04W 88/08; H04W 74/002; H04W 74/004; H04W 74/006; H04W 74/008; H04W 74/0833; H04W 74/08; H04L 5/0051; H04L 5/0048; H04L 5/16; H04L 5/14

See application file for complete search history.

(56) References Cited

U.S. PATENT DOCUMENTS

| | | | |
|---|---|---|---|
| 2020/0008240 A1* | 1/2020 | Golitschek Edler Von Elbwart | H04L 1/1819 |
| 2020/0100297 A1* | 3/2020 | Agiwal | H04B 17/327 |
| 2021/0168873 A1* | 6/2021 | Taherzadeh Boroujeni | H04W 72/542 |
| 2022/0141869 A1* | 5/2022 | Jeon | H04W 74/0833 370/329 |

(Continued)

FOREIGN PATENT DOCUMENTS

| | | | | |
|---|---|---|---|---|
| CN | 111819905 A | * | 10/2020 | .......... H04W 74/004 |
| CN | 110291733 B | * | 5/2022 | .......... H04L 1/0025 |
| TW | 202220403 A | * | 5/2022 | |

Primary Examiner — Phong La
(74) Attorney, Agent, or Firm — Sevan Savsa; Holland & Hart LLP

(57) ABSTRACT

Methods, systems, and devices for wireless communication are described. A user equipment (UE) may receive an indication of a plurality of random access occasions for uplink message transmission to a base station. The UE may determine that a first portion of the plurality of random access occasions is unavailable for use by the UE as a result of the base station operating in a full duplex mode. The UE may select one or more random access occasions from a second portion of the plurality of random access occasions instead of from the first portion based at least in part on the determining. The UE may transmit a random access message to the base station during the one or more random access occasions from the second portion.

30 Claims, 19 Drawing Sheets

(56) References Cited

U.S. PATENT DOCUMENTS

2022/0304061 A1* 9/2022 Landis .............. H04W 74/0833

* cited by examiner

INITIAL ACCESS RANDOM ACCESS OCCASION-CAUSED INTERFERENCE

FIELD OF TECHNOLOGY

The following relates to wireless communication, including initial access random access occasion-caused interference.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support initial access random access occasion-caused interference. Generally, aspects of the techniques described herein provide various mechanisms where a user equipment (UE) (e.g., an advanced UE capable of supporting both full- and half-duplex communications) can select between full-duplex configured random access channel (RACH) occasions (ROs) and half-duplex ROs based on a cross-link interference (CLI) estimation. For example, the UE (e.g., the advanced UE) may be configured with a plurality of ROs for an uplink message (e.g., a RACH preamble message). The UE may identify or otherwise determine a first portion of the ROs that are unavailable based on the base station operating in a full-duplex mode (e.g., performing a downlink transmission) and a second portion of the ROs that are available (e.g., where no downlink transmission is scheduled or the channel is otherwise determined as available) for the UE. The UE may select a RO from the second portion of ROs for transmission of the RACH preamble to establish channel access at the base station. The selected RO in the second portion of the ROs may include full-duplex and/or half-duplex ROs.

A method for wireless communication at a UE is described. The method may include receiving an indication of a set of multiple ROs for uplink message transmission to a base station, determining that a first portion of the set of multiple ROs is unavailable for use by the UE as a result of the base station operating in a full duplex mode, selecting one or more ROs from a second portion of the set of multiple ROs instead of from the first portion based on the determining, and transmitting a random access message to the base station during the one or more ROs from the second portion.

An apparatus for wireless communication at a UE is described. The apparatus may include a processor, memory coupled with the processor, and instructions stored in the memory. The instructions may be executable by the processor to cause the apparatus to receive an indication of a set of multiple ROs for uplink message transmission to a base station, determine that a first portion of the set of multiple ROs is unavailable for use by the UE as a result of the base station operating in a full duplex mode, select one or more ROs from a second portion of the set of multiple ROs instead of from the first portion based on the determining, and transmit a random access message to the base station during the one or more ROs from the second portion.

Another apparatus for wireless communication at a UE is described. The apparatus may include means for receiving an indication of a set of multiple ROs for uplink message transmission to a base station, means for determining that a first portion of the set of multiple ROs is unavailable for use by the UE as a result of the base station operating in a full duplex mode, means for selecting one or more ROs from a second portion of the set of multiple ROs instead of from the first portion based on the determining, and means for transmitting a random access message to the base station during the one or more ROs from the second portion.

A non-transitory computer-readable medium storing code for wireless communication at a UE is described. The code may include instructions executable by a processor to receive an indication of a set of multiple ROs for uplink message transmission to a base station, determine that a first portion of the set of multiple ROs is unavailable for use by the UE as a result of the base station operating in a full duplex mode, select one or more ROs from a second portion of the set of multiple ROs instead of from the first portion based on the determining, and transmit a random access message to the base station during the one or more ROs from the second portion.

In some examples of the method, apparatuses, and non-transitory computer-readable medium described herein, determining that the first portion of the set of multiple ROs may be unavailable may include operations, features, means, or instructions for monitoring for an interference level associated with a second UE transmitting an uplink message to the base station, where the monitoring occurs prior to the set of multiple ROs.

In some examples of the method, apparatuses, and non-transitory computer-readable medium described herein, monitoring the interference level may include operations, features, means, or instructions for monitoring one or more uplink feedback transmissions from the second UE to the base station and determining the interference level based on the monitoring.

In some examples of the method, apparatuses, and non-transitory computer-readable medium described herein, determining that the first portion of the set of multiple ROs may be unavailable may include operations, features, means, or instructions for selecting the one or more ROs from the second portion of the set of multiple ROs based on the interference level satisfying an interference threshold.

In some examples of the method, apparatuses, and non-transitory computer-readable medium described herein, the first portion of the set of multiple ROs includes full-duplex ROs and the second portion of the set of multiple ROs includes half-duplex ROs or the second portion of the set of multiple ROs includes the full-duplex ROs and the half-duplex ROs.

In some examples of the method, apparatuses, and non-transitory computer-readable medium described herein, monitoring the interference level may include operations, features, means, or instructions for receiving an indication of a transmission power of the uplink message transmitted by the second UE, determining a pathloss for a channel between the UE and the second UE based on the uplink message from the second UE to the base station, and identifying the interference level based on the pathloss.

In some examples of the method, apparatuses, and non-transitory computer-readable medium described herein, monitoring for the interference level may include operations, features, means, or instructions for determining a first interference level for a first set of ROs of the set of multiple ROs, where the first set of ROs may be within a first subband and determining a second interference level for a second set of ROs of the set of multiple ROs, where the second set of ROs may be within a second subband, where selecting the one or more ROs from the second portion of the set of multiple ROs may be based on at least one of the first interference level or the second interference level, and an interference threshold.

In some examples of the method, apparatuses, and non-transitory computer-readable medium described herein, determining that the first portion of the set of multiple ROs may be unavailable for use by the UE may include operations, features, means, or instructions for identifying a highest total received signal strength indication (RSSI) per uplink symbol among all uplink symbols within both the first subband and the second subband, comparing the highest total RSSI per uplink symbol from each of the first subband and the second subband with the interference threshold, and determining whether the first set of ROs, the second set of ROs, or both, may be unavailable as the first portion of the set of multiple ROs or may be available as the second portion of the set of multiple ROs based on the comparing.

In some examples of the method, apparatuses, and non-transitory computer-readable medium described herein, determining that the first portion of the set of multiple ROs may be unavailable may include operations, features, means, or instructions for monitoring each of the set of multiple ROs for an interference level, where the set of multiple ROs may be full-duplex ROs.

In some examples of the method, apparatuses, and non-transitory computer-readable medium described herein, the monitoring of each of the set of multiple ROs for the interference level may include operations, features, means, or instructions for monitoring for a reference signal from the base station, where the first portion of ROs may have interference levels based on detection of the reference signal during the first portion of ROs, and where the second portion of ROs may have interference levels based on a lack of detection of the reference signal during the second portion of ROs.

In some examples of the method, apparatuses, and non-transitory computer-readable medium described herein, the first portion of ROs may have interference levels above an interference level threshold and the second portion of ROs may have interference levels below the interference level threshold.

In some examples of the method, apparatuses, and non-transitory computer-readable medium described herein, determining that the first portion of the set of multiple ROs may be unavailable may include operations, features, means, or instructions for receiving a system information message from the base station indicating, for each random access occasion in the set of multiple ROs, whether the random access occasion may be included in the first portion of the set of multiple ROs as unavailable or included in the second portion of the set of multiple ROs as available.

A method for wireless communication at a base station is described. The method may include transmitting an indication of a set of multiple ROs for an uplink message transmission from a UE to the base station and receiving a random access message from the UE during one or more ROs from a second portion of the set of multiple ROs instead of from a first portion of the set of multiple ROs, where the first portion of the set of multiple ROs is unavailable for use by the UE as a result of the base station operating in a full duplex mode.

An apparatus for wireless communication at a base station is described. The apparatus may include a processor, memory coupled with the processor, and instructions stored in the memory. The instructions may be executable by the processor to cause the apparatus to transmit an indication of a set of multiple ROs for an uplink message transmission from a UE to the base station and receive a random access message from the UE during one or more ROs from a second portion of the set of multiple ROs instead of from a first portion of the set of multiple ROs, where the first portion of the set of multiple ROs is unavailable for use by the UE as a result of the base station operating in a full duplex mode.

Another apparatus for wireless communication at a base station is described. The apparatus may include means for transmitting an indication of a set of multiple ROs for an uplink message transmission from a UE to the base station and means for receiving a random access message from the UE during one or more ROs from a second portion of the set of multiple ROs instead of from a first portion of the set of multiple ROs, where the first portion of the set of multiple ROs is unavailable for use by the UE as a result of the base station operating in a full duplex mode.

A non-transitory computer-readable medium storing code for wireless communication at a base station is described. The code may include instructions executable by a processor to transmit an indication of a set of multiple ROs for an uplink message transmission from a UE to the base station and receive a random access message from the UE during one or more ROs from a second portion of the set of multiple ROs instead of from a first portion of the set of multiple ROs, where the first portion of the set of multiple ROs is unavailable for use by the UE as a result of the base station operating in a full duplex mode.

Some examples of the method, apparatuses, and non-transitory computer-readable medium described herein may further include operations, features, means, or instructions for receiving one or more uplink feedback transmissions from a second UE, where the first portion of the set of multiple ROs may be unavailable for use by the UE based on an interference level associated with the one or more uplink feedback transmissions satisfying an interference threshold, where the one or more uplink feedback transmissions from the second UE occur prior to the set of multiple ROs.

Some examples of the method, apparatuses, and non-transitory computer-readable medium described herein may further include operations, features, means, or instructions for transmitting, to the UE, an indication of a transmission power of the one or more uplink feedback transmissions performed by the second UE.

In some examples of the method, apparatuses, and non-transitory computer-readable medium described herein, the first portion of the set of multiple ROs includes full-duplex ROs and the second portion of the set of multiple ROs includes half-duplex ROs or the second portion of the set of multiple ROs include the full-duplex ROs and the half-duplex ROs.

Some examples of the method, apparatuses, and non-transitory computer-readable medium described herein may further include operations, features, means, or instructions for identifying a downlink transmission from the base station that overlaps in a time domain with a random access occasion of the set of multiple ROs and transmitting a reference signal accompanying the downlink transmission, where the set of multiple ROs may be full-duplex ROs.

Some examples of the method, apparatuses, and non-transitory computer-readable medium described herein may further include operations, features, means, or instructions for identifying one or more downlink transmissions from the base station that overlap in a time domain with a corresponding random access occasion of the set of multiple ROs and transmitting a system information message to the UE indicating, for each random access occasion in the set of multiple ROs, whether the random access occasion may be included in the first portion of the set of multiple ROs as unavailable or included in the second portion of the ROs as available based on the overlap.

DETAILED DESCRIPTION

Wireless communication systems generally rely on half-duplex communication techniques where a device can be either transmitting a wireless signal or monitoring a channel to receive a wireless signal. Advanced wireless communication systems may rely on full-duplex communication techniques where a device can be both transmitting a wireless signal while also monitoring a channel (e.g., using different antenna panels, subpanels, arrays, transmit/receive chains, and the like) to receive a wireless signal. For example, a base station may be performing a downlink transmission to a first user equipment (UE) while also monitoring a channel to receive an uplink transmission from a second UE. The first UE in this example may be a legacy UE (e.g., only using half-duplex communication techniques) where the second UE may be an advanced UE (e.g., supporting both full- and half-duplex communication techniques). Conventional techniques prohibit scheduling a downlink transmission to the first UE while scheduling random access occasions for the second UE for initial access in an overlapping manner. That is, such conventional techniques avoid scheduling communications during a random access occasion to favor the base station receiving random access messages for channel access. This approach may limit scheduling decisions, resulting in inefficient resource usage as well as potentially limiting channel access opportunities.

Generally, aspects of the techniques described herein provide various mechanisms where a UE (e.g., an advanced UE capable of supporting both full- and half-duplex communications) can select between full-duplex configured random access channel (RACH) occasions (ROs) and half-duplex ROs based on a cross-link interference (CLI) estimation. For example, the UE (e.g., the advanced UE) may be configured with a plurality of ROs for an uplink message (e.g., a RACH preamble message). The UE may identify or otherwise determine a first portion of the ROs that are unavailable based on the base station operating in a full-duplex mode (e.g., performing a downlink transmission) and a second portion of the ROs that are available (e.g., where no downlink transmission is scheduled or the channel is otherwise determined as available) for the UE. The UE may select a RO from the second portion of ROs for transmission of the RACH preamble to establish channel access at the base station. The selected RO in the second portion of the ROs may include full-duplex and/or half-duplex ROs.

Aspects of the disclosure are initially described in the context of wireless communications systems. Aspects of the disclosure are further illustrated by and described with reference to apparatus diagrams, system diagrams, and flowcharts that relate to initial access random access occasion-caused interference.

Figure 1:
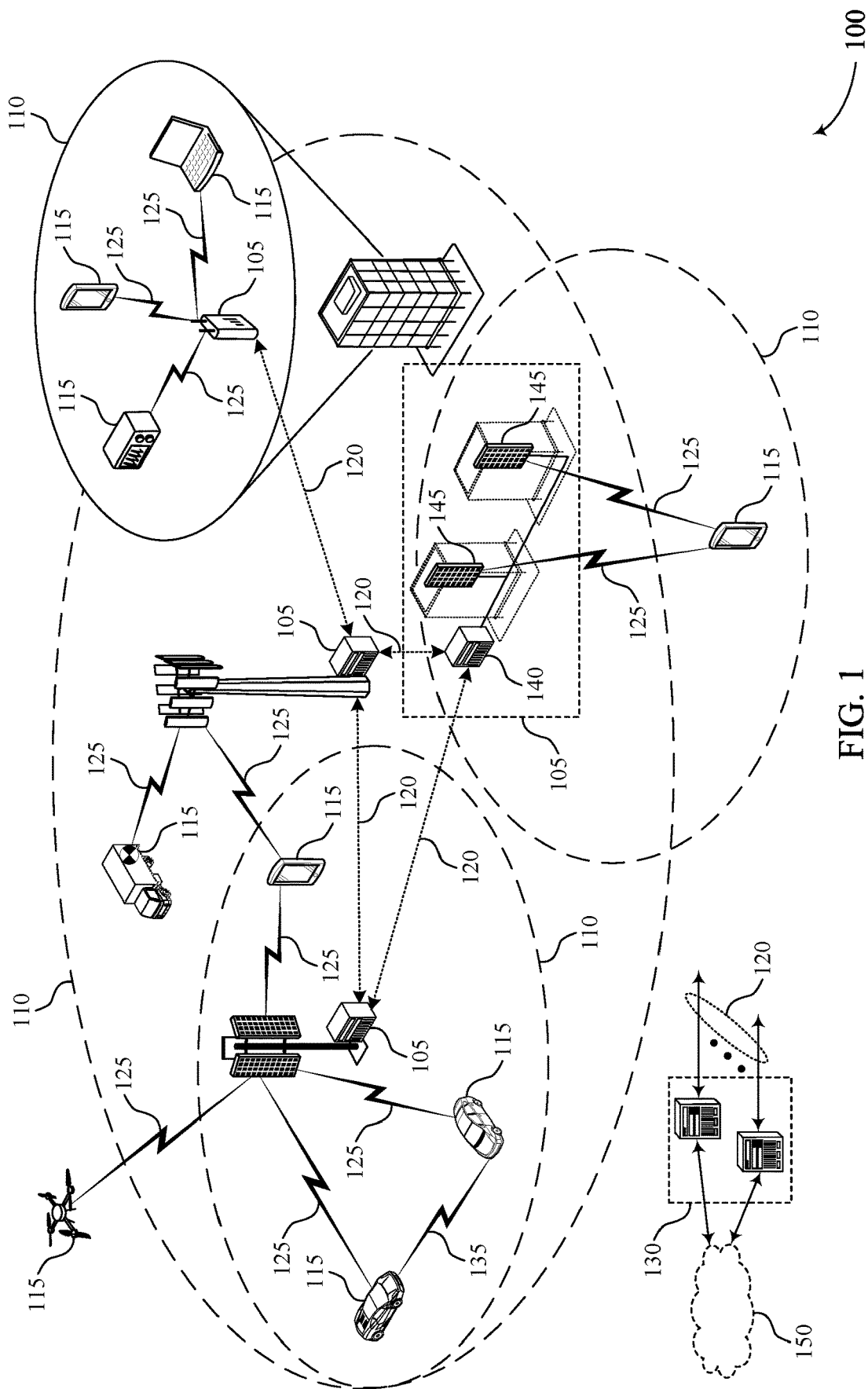
FIG. 1 illustrates an example of a wireless communications system that supports initial access random access occasion-caused interference in accordance with aspects of the present disclosure.

FIG. 1 illustrates an example of a wireless communications system 100 that supports initial access random access occasion-caused interference in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive an indication of a plurality of random access occasions for uplink message transmission to a base station 105. The UE 115 may determine that a first portion of the plurality of random access occasions is unavailable for use by the UE 115 as a result of the base station 105 operating in a full duplex mode. The UE 115 may select one or more random access occasions from a second portion of the plurality of random access occasions instead of from the first portion based at least in part on the determining. The UE 115 may transmit a random access message to the base station 105 during the one or more random access occasions from the second portion.

A base station 105 may transmit an indication of a plurality of random access occasions for an uplink message transmission from a UE 115 to the base station 105. The base station 105 may receive a random access message from the UE 115 during one or more random access occasions from a second portion of the plurality of random access occasions instead of from a first portion of the plurality of random access occasions, wherein the first portion of the plurality of random access occasions is unavailable for use by the UE 115 as a result of the base station 105 operating in a full duplex mode.

Figure 2:
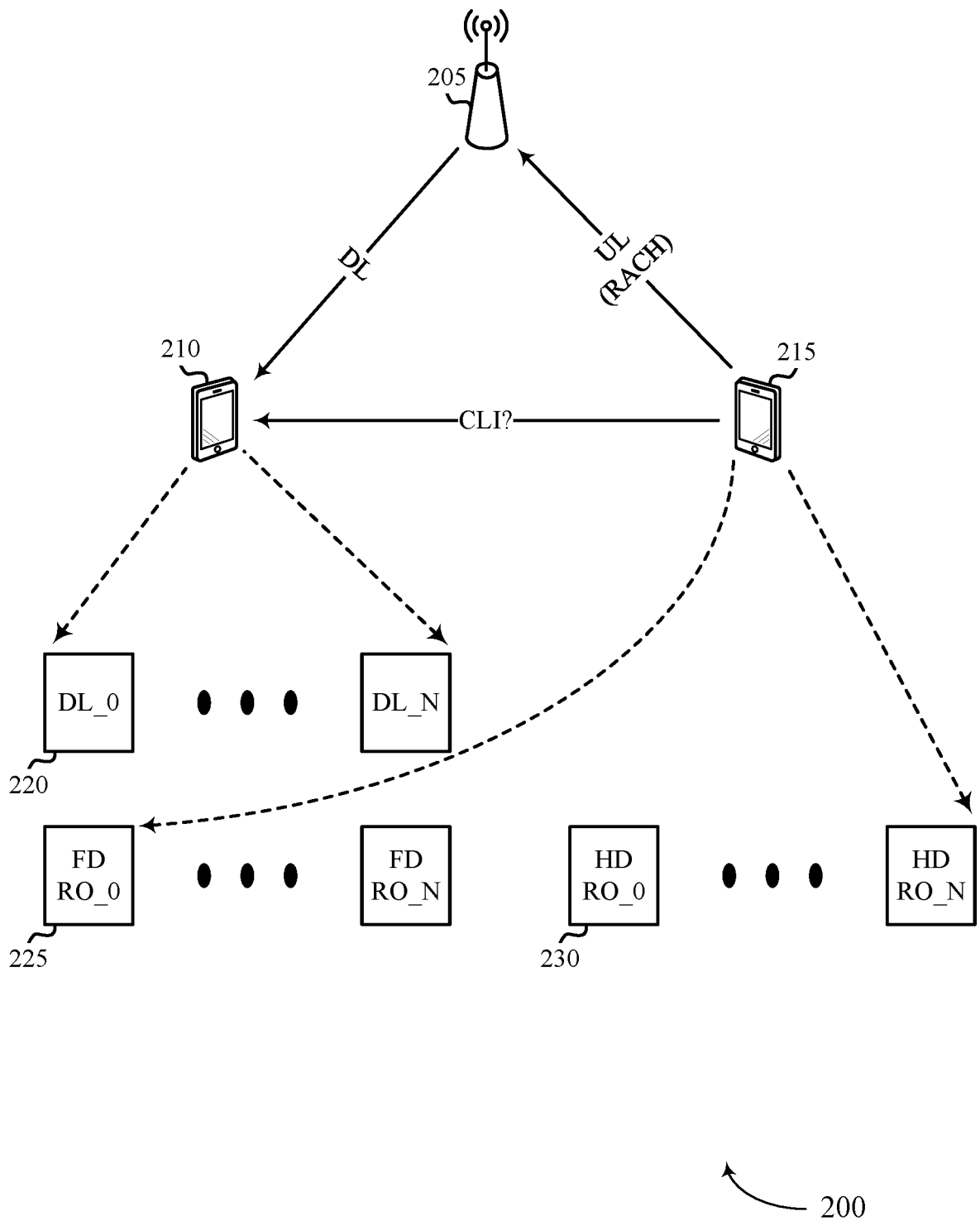
FIG. 2 illustrates an example of a wireless communication system that supports initial access random access occasion-caused interference in accordance with aspects of the present disclosure.

FIG. 2 illustrates an example of a wireless communication system 200 that supports initial access random access occasion-caused interference in accordance with aspects of the present disclosure. Wireless communication system 200 may implement aspects of wireless communication system 100. Wireless communication system 200 may include base station 205, UE 210, and UE 215, which may be examples of the corresponding devices described herein. In the non-limiting example illustrated in FIG. 2, UE 210 may be considered an example of a legacy UE and/or a UE supporting or otherwise performing half-duplex communications with base station 205 while UE 215 may be considered an example of an advanced UE performing or otherwise supporting half- and full-duplex communications with base station 205.

Accordingly, wireless communication system 200 may support both half- and full-duplex wireless communications. For example, full-duplex communications may include simultaneous uplink and downlink communications between base station 205 and UE 215 (e.g., base station 205 performing a downlink transmission to UE 210 while simultaneously monitoring a channel to receive an uplink transmission from UE 215). Half-duplex communications may include UE 210 performing an uplink transmission to base station 205 or monitoring a channel to receive a downlink transmission from base station 205, but not both at the same time. Full-duplex communications may also be performed within one or more frequency ranges, such as frequency range 2 (FR2).

However, it is to be understood that full-duplex communication capabilities may be present at both base station 205 and/or UE 215 (including UE 210 when configured to support such full-duplex communications) in accordance with the techniques described herein. In an example where the UE supports full-duplex communications (e.g., UE 215), this may include the UE performing an uplink transmission from one panel (e.g., antenna panel/subpanel, antenna configuration, beam, port, layer, etc.) while simultaneously receiving a downlink transmission using a second panel. In an example where the base station supports full-duplex communications (e.g., base station 205), this may include the base station receiving an uplink transmission on one panel (e.g., antenna panel/subpanel, antenna configuration, beam, port, layer, etc.) while simultaneously performing a downlink transmission using a second panel. In some examples, full-duplex support may be based on beam separation, and the like.

Full-duplex communications may provide benefits such as increased throughput (e.g., based on uplink and downlink communications occurring concurrently), reduced latency (e.g., enables receiving a downlink signal in uplink-only configured slots), improved spectrum efficiency (e.g., on a per cell basis and/or a per UE basis), and overall more efficient resource utilization. Full-duplex communications may also be associated with self-interference between the uplink and downlink signal, clutter echo, and the like.

Accordingly, full-duplex communications may occur in different scenarios. One scenario may involve one UE communicating with different base stations, cells, TRPs, etc., (e.g., nodes) where the UE receives a downlink transmission from one node while performing an uplink transmission to the second node. Another scenario may involve one base station, cell, TRP, etc., performing a downlink transmission to a UE while the UE simultaneously performs an uplink transmission to the node. Yet another scenario is illustrated in wireless communication system 200 where one base station (e.g., base station 205) performing a downlink transmission to a first UE (e.g., UE 210 in this example) while simultaneously monitoring a channel to receive an uplink transmission from a second UE (e.g., UE 215 in this example).

Base station 205 may schedule one or more downlink transmissions 220 to UE 210, with N downlink transmissions 220 being shown by way of example only. In some aspects, each downlink transmission 220 may be dynamically scheduled (e.g., dynamically granted resources via a DCI grant), semi-persistently scheduled (e.g., (pre)configured semi-persistent resources activated by a DCI, MAC CE, etc.), and/or persistently scheduled (e.g., persistently scheduled resources) available for downlink transmissions 220.

Base station 205 may also schedule or otherwise configure a plurality of ROs for UE 215 to use for initial access (e.g., for RACH preamble message transmissions). The plurality of ROs may include full-duplex (FD) ROs 225 and/or half-duplex (HD) ROs 230. The FD ROs 225 may generally refer to ROs configured for UE 215 that overlap in the time domain with downlink transmissions 220. The HD ROs 230 may generally refer to ROs configured for UE 215 that do not overlap in the time domain with downlink transmissions 220. In the non-limiting example illustrated in FIG. 2, UE 210 may be unaware of the plurality of ROs that base station 205 has configured for UE 210.

However, in some aspects UE 215 performing an uplink transmission to base station 205 using a FD RO 225 may introduce interference (e.g., cross-link interference (CLI)) to UE 210, which may interrupt or otherwise interfere with UE 210 receiving the downlink transmission from base station 205. Accordingly, UE 215 may estimate the CLI while in an RRC inactive or idle mode prior to selecting a RO to use for initial access (e.g., to mitigate, manage, or otherwise control the inter-UE CLI when UE 215 is not operating in the RRC connected mode).

Broadly, this may include UE 215 receiving or otherwise obtaining an indication of the plurality of ROs for uplink message transmission to base station 205. For example, base station 205 may broadcast or multicast a message identifying the plurality of ROs available for the uplink message transmission (e.g., RACH preamble message transmissions). Base station 205 may unicast a message (e.g., an RRC message) to UE 215 indicating the plurality of ROs configured for or otherwise available to UE 215 to use for the uplink message transmissions. As discussed above, the plurality of ROs may include FD ROs 225 that overlap in the time domain with one or more downlink transmissions 220 configured for or otherwise available to UE 210 to receive a downlink transmission 220 from base station 205.

UE 215 may identify, select, or otherwise determine a first portion of the plurality of ROs that are unavailable for use by UE 215 as a result of base station 205 operating in a FD mode (e.g., performing the downlink transmission 220 to UE 210 while receiving the uplink message from UE 215). UE 215 may identify, select, or otherwise determine a second portion of the plurality of ROs are available for use by UE 215 to use for the uplink message transmissions.

Broadly, this may include UE 215 determining that one or more of the downlink transmission 220 is being used (e.g., scheduled, activated, or otherwise in use) and including the FD RO 225 overlapping in the time domain in the first portion of the ROs. In some examples, this may include UE 215 determining that the downlink transmission is being used, but that the estimated CLI being introduced by UE 215 performing the uplink message transmission during the overlapping RO is at or below a threshold interference level. For example, UE 215 may monitor one or more channels, subbands, bandwidths, BWPs, etc., to identify or otherwise estimate the strength of the downlink signal received by UE 210 and use this to estimate the CLI. In some examples, UE 215 may monitor prior to the plurality of ROs to select the ROs to be included in the second portion of the ROs, such as during a monitoring/sensing window. In some examples, UE 215 may monitor for the downlink transmission immediately prior to (e.g., during a brief monitoring/sensing period prior to each RO) to select the ROs to be included in the second portion of the ROs. In some examples, base station 205 may determine which downlink transmission 220 opportunity is being used for UE 210, and indicate the available ROs from the plurality of ROs to include in the second portion of the ROs based on the downlink transmission 220 use. More detailed examples of UE 215 selecting the RO(s) to be included in the first portion of ROs as being unavailable for use or in the second portion of ROs as being available for use are illustrated in FIGS. 3-6 discussed below.

Accordingly, in some examples the first portion of ROs that are not available for use by UE 215 based on base station 205 operating in the full duplex mode (e.g., performing downlink transmission(s) to UE 210 during overlapping RO(s)) may include one or more of the FD ROs 225 (e.g., the FD RO(s) 225 overlapping in time with unused or otherwise non-interfered with downlink transmission(s) 220). The second portion of ROs that are available for use by UE 215 based on base station 205 operating in the full duplex mode (e.g., not performing a downlink transmission 220 during an overlapping FD RO 225) as well as the HD ROs 230, in this example. UE 215 may transmit or otherwise provide a random access message (e.g., a RACH preamble or a RACH message A) to base station 205 during ROs from the second portion of ROs (e.g., to establish a connection with base station 205).

Figure 3:
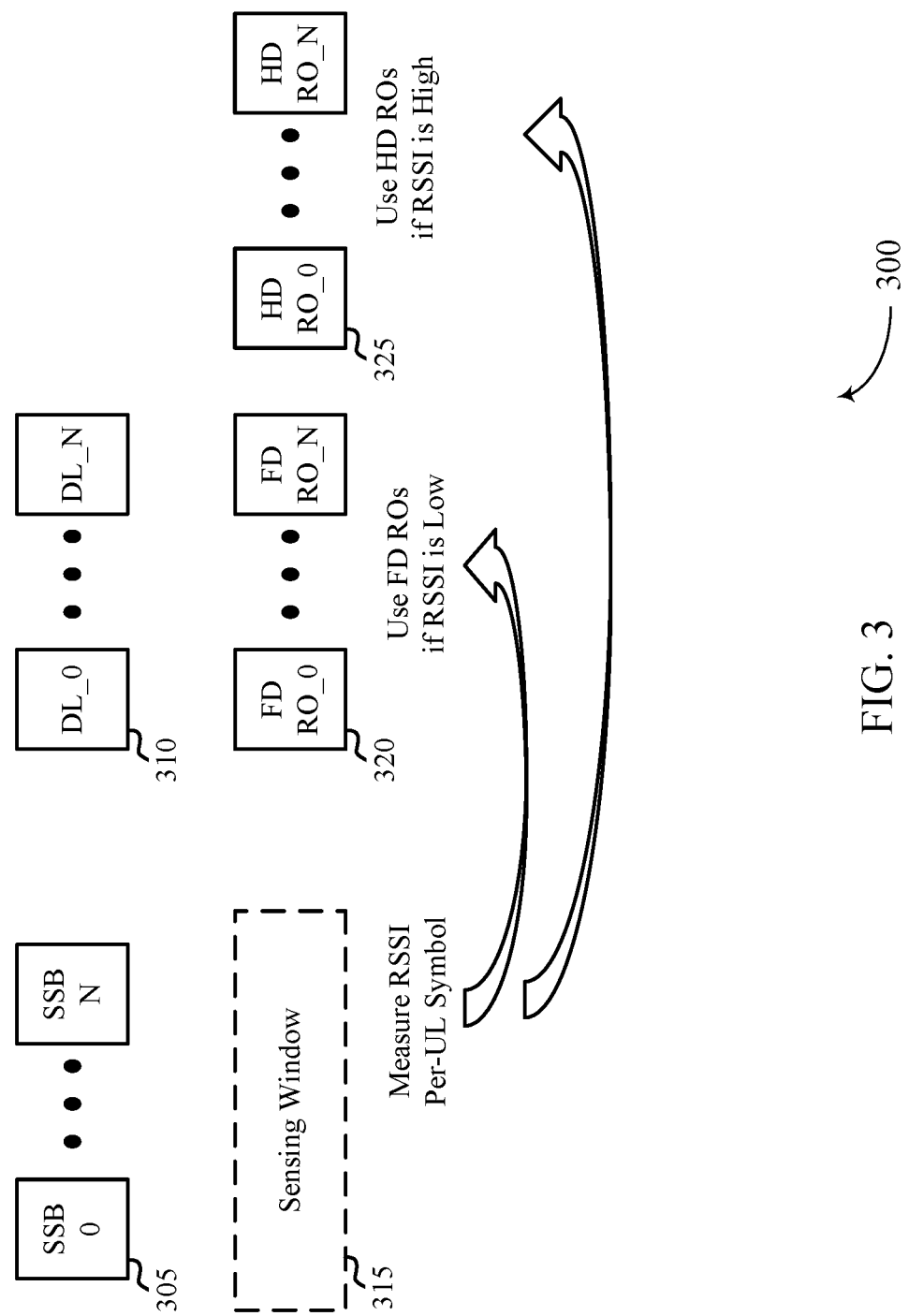
FIG. 3 illustrates an example of a sensing configuration that supports initial access random access occasion-caused interference in accordance with aspects of the present disclosure.

FIG. 3 illustrates an example of a sensing configuration 300 that supports initial access random access occasion-caused interference in accordance with aspects of the present disclosure. Sensing configuration 300 may implement aspects of wireless communication systems 100 and/or 200. Aspects of sensing configuration 300 may be implemented by a UE and/or a base station, which may be examples of the corresponding devices described herein.

Broadly, aspects of the techniques discussed herein provide for the UE to select which (pre)configured ROs are available for use based on the base station operating in full-duplex mode. For example, the base station may be configured to perform one or more downlink transmissions 310 to a UE (e.g., a legacy UE). The base station may also (pre)configure a plurality of ROs for another UE (e.g., an advanced UE) to use for initial access (e.g., RACH preamble uplink message transmission). For example, the base station may configure one or more FD ROs 320 and one or more HD ROs 325. Each RO may generally correspond to a resource available for use by the advanced UE to transmit a RACH preamble uplink message to (re)establish a connection with the base station (e.g., during initial access and/or when transitioning from an RRC idle or inactive mode to a RRC connected mode). The FD ROs 320 may generally correspond to any RO (pre)configured for the advanced UE to use, but which overlaps in the time domain with at least one of the one or more downlink transmissions 310. Conversely, the one or more HD ROs 325 may correspond to RO(s) from the plurality of (pre)configured ROs that do not overlap with a downlink transmission to the legacy UE.

Accordingly, the base station may transmit or otherwise provide an indication of the plurality of ROs for uplink message transmission (e.g., the RACH preamble uplink message transmission from the advanced UE to the base station). The indication may be transmitted in a broadcast transmission, a multicast transmission, or a unicast transmission. In some examples, the indication may be transmitted in RRC messaging (pre)configuring the plurality of ROs for the advanced UE.

The advanced UE may identify, select, or otherwise determine first and second portions of the ROs from the plurality of (pre)configured ROs. The first portion of ROs may generally correspond to the ROs that are unavailable for use, even though (pre)configured, for the advanced UE to use to perform the uplink message transmission to the base station. In some aspects, the ROs in the first portion of ROs may be based on the base station operating in the full-duplex mode. For example, the base station scheduling the one or more downlink transmissions 310 to the legacy UE that overlap in the time domain with one or more ROs of the plurality of ROs (e.g., FD ROs 320) (pre)configured for the advanced UE, which may result in one or more of the FD ROs 320 being unavailable for use by the advanced UE. The second portion of ROs from the plurality of ROs (pre)configured for the advanced UE may generally include ROs that are available for use by the advanced UE to perform the uplink message transmission to the base station. That is the UE may identify, select, or otherwise determine the ROs from the plurality of ROs that are available (e.g., to be included in the second portion of ROs) according to the techniques discussed herein, which may include HD ROs 325 and one, some, all, or none of the FD ROs 320. Accordingly, the UE may select a RO from the second portion that are available for use (e.g., rather than the RO(s) from the first portion which are unavailable) and transmit a random access message (e.g., the uplink message transmission, which may be a RACH preamble or RACH message A in some examples) to the base station.

Sensing configuration 300 illustrates an example where the UE (e.g., the advanced UE configured with the plurality of ROs) identifies, selects, or otherwise determines which RO(s) are available (e.g., to be included in the second portion) or unavailable (e.g., to be included in the first portion) based on monitoring for an interference level. For example, the UE may monitor for an interference level associated with the legacy UE (e.g., the UE scheduled with the one or more downlink transmissions 310, which may also be referred to as a second UE) transmitting an uplink message to the base station (e.g., a physical uplink control channel (PUCCH), a physical uplink shared channel (PUSCH), or any other uplink transmission). In some aspects, the monitoring for the interference level may occur prior to one or more of the plurality of (pre)configured ROs. For example, the base station may perform one or more synchronization signal block (SSB) transmissions 305. The legacy UE (e.g., the second UE in this example) may transmit an uplink message to the base station based at least in part on the one or more SSB transmissions 305. The advanced UE may monitor for the uplink message transmissions during a sensing window 315 and measure a total reference signal strength indicator (RSSI) on a per-uplink symbol basis during the sensing window 315.

Accordingly and without additional signaling from the base station, the advanced UE may sense an ongoing uplink transmission, such as an uplink feedback message(s) from the legacy UE to the base station to select between the FD ROs 320 and the HD ROs 325, e.g., to determine the interference level, such as the CLI. In some examples, the base station may prioritize scheduling of the uplink feedback message transmissions from the legacy UE during an uplink RRC symbol. The advanced UE may measure the total RSSI per RRC uplink symbol during the sensing window 315, which occurs before the intended RO. If the highest total RSSI per uplink symbol among all uplink symbols in the sensing window 315 is below the interference threshold, the UE may use the FD ROs 320 for the uplink message transmission. Otherwise, the advanced UE may select from the HD ROs 325 for the uplink message transmission.

This may be based, at least to some degree, on the measured interference level observed by the advanced UE from monitoring the legacy UE performing an uplink transmission to the base station may be approximately equal to the interference level the advanced UE would introduce into the legacy UE if it were to perform its RACH uplink message transmission to the base station during the overlapping FD RO. This may enable the advanced UE to more efficiently utilize the FD ROs 320 without introducing an unacceptable level of interference to the legacy UE. Of course, positioning within the coverage area of the base station, differences in round-trip-time (RTT), channel properties, etc., may also be used to improve RO selection for the second portion.

If the highest RSSI monitored during the sensing window 315 is low (e.g., at, below, or otherwise satisfying an interference threshold), the advanced UE may select a RO from the FD ROs 320 to include in the second portion of ROs (e.g., as available). The advanced UE may also include the HD ROs 325 in the second portion. If the highest RSSI monitored during the sensing window 315 is high (e.g., at, above, or otherwise not satisfying the interference threshold), the advanced may determine that the FD ROs 320 are unavailable (e.g., to be included in the first portion of unavailable ROs). Instead, the advanced UE may select a RO from the HD ROs 325 to perform the random access message transmission to the base station. In some examples the first portion includes the FD ROs 320 and the second portion includes the HD ROs 325 (e.g., depending on the interference level monitored during the sensing window 315). In some examples, the second portion includes the FD ROs 320 and the HD ROs 325 (e.g., the first portion includes zero ROs of the (pre)configured plurality of ROs).

In some non-limiting examples, the base station may transmit or otherwise provide an indication of the transmit power level for the uplink message transmission from the legacy UE (e.g., the second UE in this example). For example and to account for different transmit power levels used by the legacy UE, the base station may broadcast—to the advanced UE—a nominal transmit power level of an ongoing uplink message transmission from the legacy UE. The advanced UE may use the indication of the transmission power of the uplink message transmitted by the legacy UE to measure, identify, calculate, or otherwise determine the pathloss value in combination with the measured the RSSI. The advanced UE may determine the interference level based on the pathloss and the measured interference level. Based on the pathloss and the transmission power of the legacy UE, the advanced UE may select a RO from the one or more FD ROs 320 if the interference level introduced into the legacy UE is at or below the interference threshold.

Figure 4:
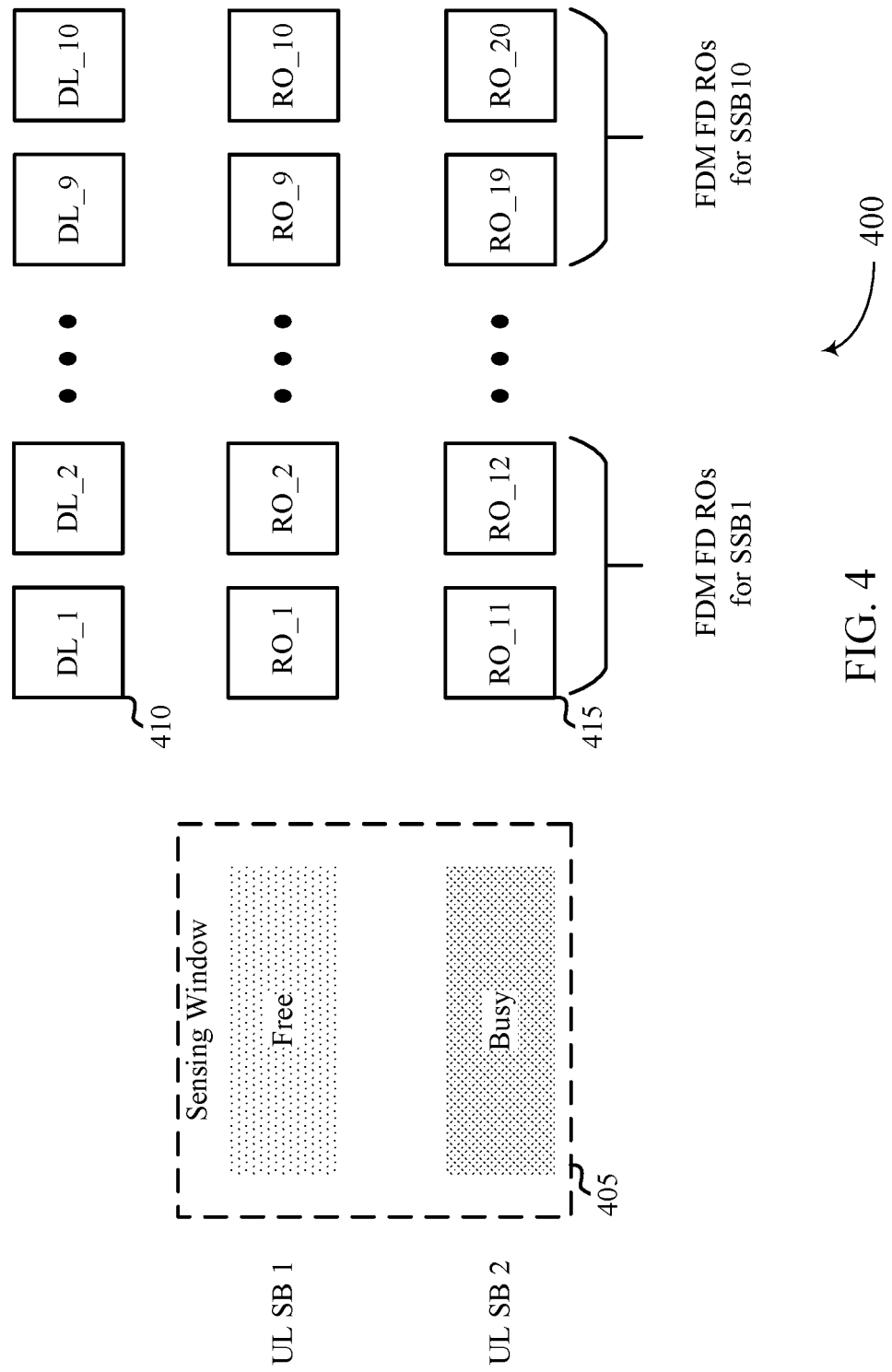
FIG. 4 illustrates an example of a sensing configuration that supports initial access random access occasion-caused interference in accordance with aspects of the present disclosure.

FIG. 4 illustrates an example of a sensing configuration 400 that supports initial access random access occasion-caused interference in accordance with aspects of the present disclosure. Sensing configuration 400 may implement aspects of wireless communication systems 100 and/or 200 and/or sensing configuration 300. Aspects of sensing configuration 400 may be implemented by a UE and/or a base station, which may be examples of the corresponding devices described herein.

Broadly, aspects of the techniques discussed herein provide for the UE to select which (pre)configured ROs are available for use based on the base station operating in full-duplex mode. For example, the base station may be configured to perform one or more downlink transmissions 410 to a UE (e.g., a legacy UE). The base station may also (pre)configure a plurality of ROs 415 (e.g., FD ROs) for another UE (e.g., an advanced UE) to use for initial access (e.g., RACH preamble uplink message transmission). For example, the base station may configure one or more FD ROs for the advanced UE (HD ROs may also be configured but are not illustrated in this example). Each RO may generally correspond to a resource available for use by the advanced UE to transmit a RACH preamble uplink message to (re)establish a connection with the base station (e.g., during initial access and/or when transitioning from an RRC idle or inactive mode to a RRC connected mode). The FD ROs may generally correspond to any RO (pre)configured for the advanced UE to use, but which overlaps in the time domain with at least one of the one or more downlink transmissions 410. In the non-limiting example illustrated in FIG. 4, the plurality of ROs 415 are multiplexed in the frequency domain (e.g., configured on different subband(s) (SB)(s)) on a per-subband basis. For example, a first set of ROs of the plurality of ROs 415 may be within a first subband (e.g., uplink (UL) subband (SB) one) and a second set of ROs of the plurality of ROs 415 may be within a second subband (e.g., UL SB 2). In the non-limiting example illustrated in FIG. 4, the first set of ROs may include ROs 1-10 and the second set of ROs may include ROs 11-20.

Accordingly, the base station may transmit or otherwise provide an indication of the plurality of ROs 415 for uplink message transmission (e.g., the RACH preamble uplink message transmission from the advanced UE to the base station). The indication may be transmitted in a broadcast transmission, a multicast transmission, or a unicast transmission. In some examples, the indication may be transmitted in RRC messaging (pre)configuring the plurality of ROs 415 for the advanced UE.

The advanced UE may identify, select, or otherwise determine first and second portions of the ROs from the plurality of ROs 415. The first portion of ROs may generally correspond to the ROs that are unavailable for use, even though (pre)configured, for the advanced UE to use to perform the uplink message transmission to the base station.

In some aspects, the ROs in the first portion of ROs may be based on the base station operating in the full-duplex mode. For example, the base station scheduling the one or more downlink transmissions 410 to the legacy UE that overlap in the time domain with one or more ROs of the plurality of ROs 415 (pre)configured for the advanced UE, which may result in one or more of the FD ROs being unavailable for use by the advanced UE. The second portion of ROs from the plurality of ROs 415 (pre)configured for the advanced UE may generally include ROs that are available for use by the advanced UE to perform the uplink message transmission to the base station. That is the UE may identify, select, or otherwise determine the ROs from the plurality of ROs that are available (e.g., to be included in the second portion of ROs) according to the techniques discussed herein. Accordingly, the UE may select a RO from the second portion that are available for use (e.g., rather than the RO(s) from the first portion which are unavailable) and transmit a random access message (e.g., the uplink message transmission, which may be a RACH preamble or RACH message A in some examples) to the base station.

Sensing configuration 400 illustrates an example where the UE (e.g., the advanced UE configured with the plurality of ROs 415) identifies, selects, or otherwise determines which RO(s) are available (e.g., to be included in the second portion) or unavailable (e.g., to be included in the first portion) based on monitoring for an interference level. For example, the UE may monitor for an interference level associated with the legacy UE (e.g., the UE scheduled with the one or more downlink transmissions 410, which may also be referred to as a second UE) transmitting an uplink message to the base station (e.g., a PUCCH, a PUSCH, or any other uplink transmission). In some aspects, the monitoring for the interference level may occur prior to one or more of the plurality of (pre)configured ROs. For example, the base station may perform one or more SSB transmissions. The legacy UE (e.g., the second UE in this example) may transmit an uplink message to the base station based at least in part on the one or more SSB transmissions. The advanced UE may monitor for the uplink message transmissions during a sensing window 405 and measure a total RSSI on a per-uplink symbol basis during the sensing window 405. As discussed, the plurality of ROs 415 may be FDM and associated with a given SSB (e.g., FDM FD ROs for SSB1 including ROs 1, 2, 11, and 12, and FDM FD ROs for SSB2 including ROs 9, 10, 19, and 20). Multiple FD ROs may be configured in time for a given SSB for the advance UE to randomly select from to support CLI diversity.

In this example including the FDM ROs, the advanced UE may sense each uplink subband in the sensing window and determine that a given subband is available (and hence the ROs within that subband) for use when the highest total RSSI per uplink symbol among all uplink symbols within the sensing window 405 is below an interference threshold. In this instance, the advanced UE may select a RO from the ROs within the subband based on the highest total RSSI per uplink symbol among all uplink symbols within the sensing window 405 is below the interference threshold. Otherwise, the advanced UE may identify or otherwise determine that the uplink subband is busy (e.g., unavailable, and therefore to be included in the first portion of ROs). This may include the advanced UE identifying the highest total RSSI per uplink symbol among all uplink symbols within the first and second subbands. The advanced UE may compare the highest total RSSI per uplink symbol from both the first and second subbands.

This may include the advanced UE determining a first interference level for the first set of ROs within the first subband and a second interference level for the second set of ROs within the second subband. Based on the first and second interference levels, the advanced UE may identify, select, or otherwise determine which ROs to include in the first portion (e.g., as unavailable) and which ROs to include in the second portion (e.g., as available). For example, if the first interference level satisfies the interference threshold (e.g., the first interference level is at or below an acceptable interference level), the first set of ROs may be included in the second portion of ROs of the plurality of ROs 415. Otherwise, the first set of ROs may be included in the first portion of ROs (e.g., are unavailable). Similarly, if the second interference level satisfies the interference threshold, the second set of ROs may be included in the second portion of ROs of the plurality of ROs 415. Otherwise, the second set of ROs may be included in the first portion of ROs (e.g., are unavailable). Accordingly, based on the sensing result the advanced UE may select the FD ROs in the free uplink subband(s) to use for the uplink RACH preamble message transmission.

Figure 5:
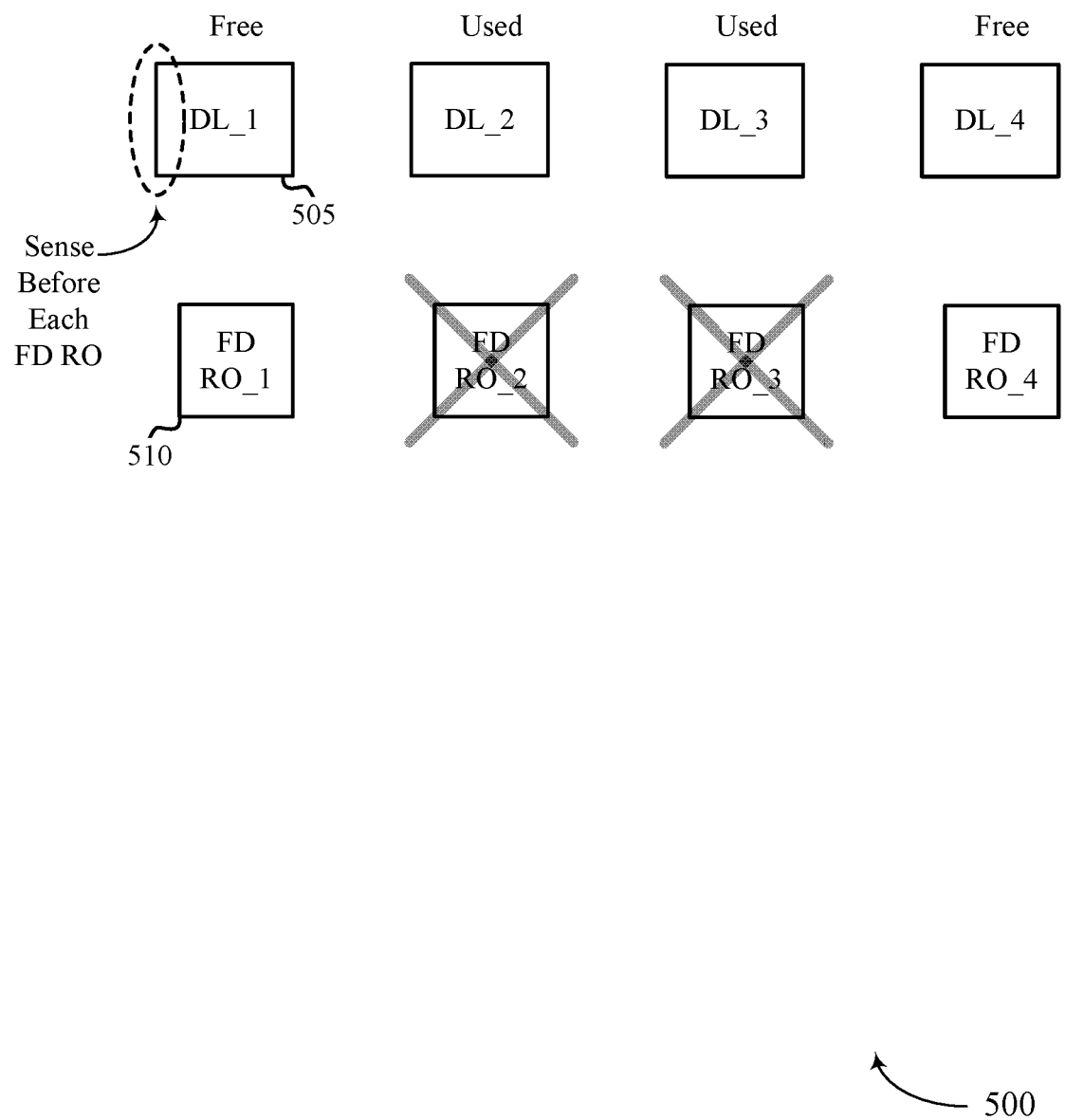
FIG. 5 illustrates an example of a sensing configuration that supports initial access random access occasion-caused interference in accordance with aspects of the present disclosure.

FIG. 5 illustrates an example of a sensing configuration 500 that supports initial access random access occasion-caused interference in accordance with aspects of the present disclosure. Sensing configuration 500 may implement aspects of wireless communication systems 100 and/or 200 and/or sensing configurations 300 and/or 400. Aspects of sensing configuration 500 may be implemented by a UE and/or a base station, which may be examples of the corresponding devices described herein.

Broadly, aspects of the techniques discussed herein provide for the UE to select which (pre)configured ROs are available for use based on the base station operating in full-duplex mode. For example, the base station may be configured to perform one or more downlink transmissions 505 to a UE (e.g., a legacy UE). The base station may also (pre)configure a plurality of ROs (e.g., FD ROs 510) for another UE (e.g., an advanced UE) to use for initial access (e.g., RACH preamble uplink message transmission). For example, the base station may configure one or more FD ROs 510 for the advanced UE (HD ROs may also be configured but are not illustrated in this example). Each RO may generally correspond to a resource available for use by the advanced UE to transmit a RACH preamble uplink message to (re)establish a connection with the base station (e.g., during initial access and/or when transitioning from an RRC idle or inactive mode to a RRC connected mode). The FD ROs 510 may generally correspond to any RO (pre)configured for the advanced UE to use, but which overlaps in the time domain with at least one of the one or more downlink transmissions 505.

Accordingly, the base station may transmit or otherwise provide an indication of the plurality of ROs for uplink message transmission (e.g., the RACH preamble uplink message transmission from the advanced UE to the base station). The indication may be transmitted in a broadcast transmission, a multicast transmission, or a unicast transmission. In some examples, the indication may be transmitted in RRC messaging (pre)configuring the plurality of ROs for the advanced UE.

The advanced UE may identify, select, or otherwise determine first and second portions of the ROs from the plurality of ROs (e.g., first and second portions of FD ROs 510). The first portion of ROs may generally correspond to the ROs that are unavailable for use, even though (pre)configured, for the advanced UE to use to perform the uplink message transmission to the base station. In some aspects, the ROs in the first portion of ROs may be based on the base station operating in the full-duplex mode. For example, the base station scheduling the one or more downlink transmissions 505 to the legacy UE that overlap in the time domain with one or more ROs of the plurality of ROs (pre)configured for the advanced UE, which may result in one or more of the FD ROs 510 being unavailable for use by the advanced UE. The second portion of ROs from the plurality of ROs (pre)configured for the advanced UE may generally include ROs that are available for use by the advanced UE to perform the uplink message transmission to the base station. That is the UE may identify, select, or otherwise determine the ROs from the plurality of ROs that are available (e.g., to be included in the second portion of ROs) according to the techniques discussed herein. Accordingly, the UE may select a RO from the second portion that are available for use (e.g., rather than the RO(s) from the first portion which are unavailable) and transmit a random access message (e.g., the uplink message transmission, which may be a RACH preamble or RACH message A in some examples) to the base station.

Sensing configuration 500 illustrates an example where the UE (e.g., the advanced UE configured with the plurality of ROs (including FD ROs 510) identifies, selects, or otherwise determines which RO(s) are available (e.g., to be included in the second portion) or unavailable (e.g., to be included in the first portion) based on monitoring for an interference level. For example, the UE may monitor for an interference level associated with each FD RO 510 before the FD RO 510. The UE may monitor each RO of the plurality of ROs (e.g., each FD RO 510) for an interference level. Generally, the advanced UE may monitor for a downlink transmission 505 for a time period occurring before each FD RO 510 to identify or otherwise determine if that FD RO 510 is available (e.g., included in the second portion) or unavailable (e.g., included in the first portion) based on the measured interference level in relation to an interference threshold.

If the measured RSSI during the period before the FD RO 510 is below the interference threshold, the advanced UE may determine that FD RO 510 is available (e.g., included in the second portion). If the measured RSSI during the period before the FD RO 510 is at or above the interference threshold, the advanced UE may determine that FD RO 510 is unavailable (e.g., included in the first portion). In the non-limiting example illustrated in FIG. 5, the advanced UE may determine (e.g., based on the monitoring) that the first (FD RO 1) and fourth (FD RO 4) FD ROs 510 are available (e.g., included in the second portion) and that the second (FD RO 2) and third (FD RO 3) FD ROs 510 are unavailable (e.g., included in the second portion).

In some examples, the advanced UE may monitor before each FD RO 510 to detect whether the overlapping downlink transmission 505 is being performed by the base station. For example, the base station may schedule the downlink transmission 505 to begin X symbols prior to the FD RO 510, with X being a positive integer. Accordingly, the base station may begin performing the downlink transmission 505 (e.g., a first and fourth downlink transmissions) to the legacy UE and the advanced UE may monitor the channel to detect whether or not the downlink transmission 505 is being used (e.g., is being performed). If the advanced UE determines that the downlink transmission 505 is being performed (e.g., is detected during the monitoring), then the overlapping FD RO 510 may be considered unavailable (e.g., included in the first portion). If the advanced UE determines that the downlink transmission 505 is not being performed (e.g., is not detected during the monitoring), then the overlapping FD RO 510 may be considered available (e.g., included in the second portion).

In some examples, the base station may instead transmit a reference signal during the period before each overlapping downlink transmission 505 and FD RO 510 to indicate whether the downlink transmission 505 is being performed. For example, the base station may transmit the reference signal before used downlink transmissions 505 and refrain from transmitting the reference signal before unused downlink transmissions 505 (e.g., scheduled downlink transmissions 505 that are not being performed for various reasons). Accordingly, the advanced UE may monitor for a downlink transmission 505 and/or reference signal from the base station before each FD RO 510 to determine whether the FD RO 510 is available (e.g., in the second portion based on a lack of detection) or is unavailable (e.g., in the first portion based on a detection).

The advanced UE may select from the second portion of ROs to transmit the uplink message to the base station.

Figure 6:
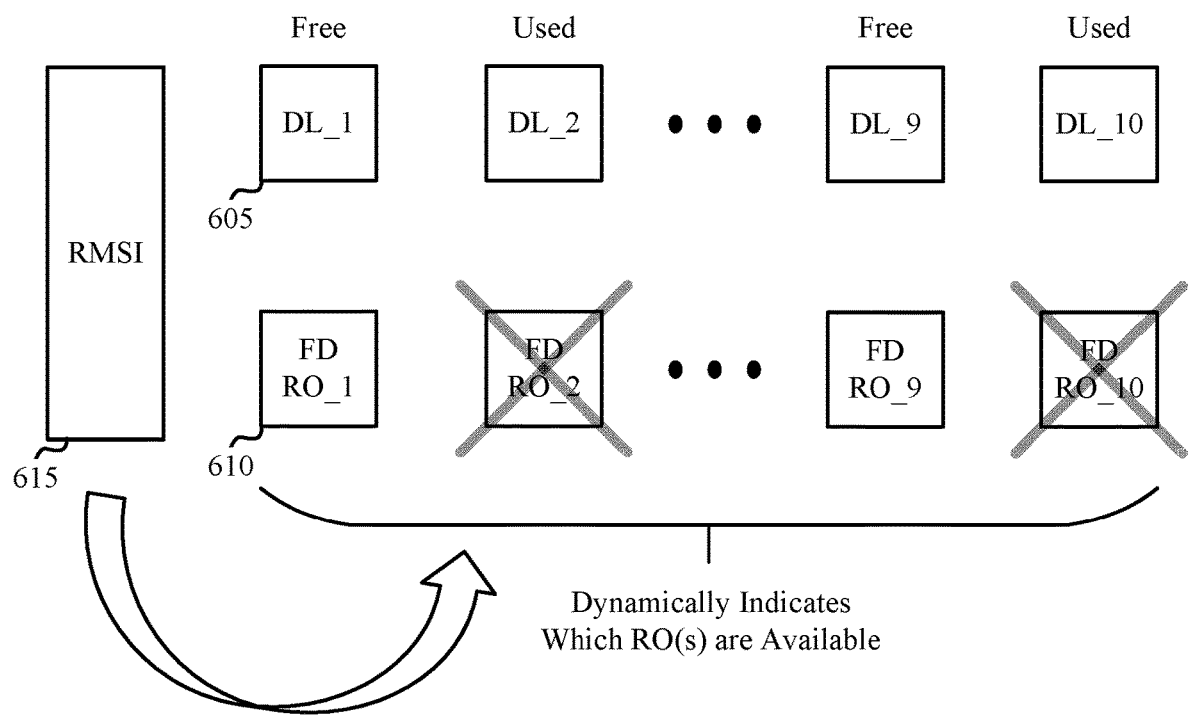
FIG. 6 illustrates an example of a sensing configuration that supports initial access random access occasion-caused interference in accordance with aspects of the present disclosure.

FIG. 6 illustrates an example of a sensing configuration 600 that supports initial access random access occasion-caused interference in accordance with aspects of the present disclosure. Sensing configuration 600 may implement aspects of wireless communication systems 100 and/or 200 and/or sensing configurations 300, 400 and/or 500. Aspects of sensing configuration 600 may be implemented by a UE and/or a base station, which may be examples of the corresponding devices described herein.

Broadly, aspects of the techniques discussed herein provide for the UE to select which (pre)configured ROs are available for use based on the base station operating in full-duplex mode. For example, the base station may be configured to perform one or more downlink transmissions 605 to a UE (e.g., a legacy UE). The base station may also (pre)configure a plurality of ROs (e.g., FD ROs 610) for another UE (e.g., an advanced UE) to use for initial access (e.g., RACH preamble uplink message transmission). For example, the base station may configure one or more FD ROs 610 for the advanced UE (HD ROs may also be configured but are not illustrated in this example). Each RO may generally correspond to a resource available for use by the advanced UE to transmit a RACH preamble uplink message to (re)establish a connection with the base station (e.g., during initial access and/or when transitioning from an RRC idle or inactive mode to a RRC connected mode). The FD ROs 610 may generally correspond to any RO (pre)configured for the advanced UE to use, but which overlaps in the time domain with at least one of the one or more downlink transmissions 605.

Accordingly, the base station may transmit or otherwise provide an indication of the plurality of ROs for uplink message transmission (e.g., the RACH preamble uplink message transmission from the advanced UE to the base station). The indication may be transmitted in a broadcast transmission, a multicast transmission, or a unicast transmission. In some examples, the indication may be transmitted in RRC messaging (pre)configuring the plurality of ROs for the advanced UE.

The advanced UE may identify, select, or otherwise determine first and second portions of the ROs from the plurality of ROs (e.g., first and second portions of FD ROs 610). The first portion of ROs may generally correspond to the ROs that are unavailable for use, even though (pre)configured, for the advanced UE to use to perform the uplink message transmission to the base station. In some aspects, the ROs in the first portion of ROs may be based on the base station operating in the full-duplex mode. For example, the base station scheduling the one or more downlink transmissions 605 to the legacy UE that overlap in the time domain with one or more ROs of the plurality of ROs (pre)configured for the advanced UE, which may result in one or more of the FD ROs 610 being unavailable for use by the advanced UE. The second portion of ROs from the plurality of ROs (pre)configured for the advanced UE may generally include ROs that are available for use by the advanced UE to perform the uplink message transmission to the base station. That is the UE may identify, select, or otherwise determine the ROs from the plurality of ROs that are available (e.g., to be included in the second portion of ROs) according to the techniques discussed herein. Accordingly, the UE may select a RO from the second portion that are available for use (e.g., rather than the RO(s) from the first portion which are unavailable) and transmit a random access message (e.g., the uplink message transmission, which may be a RACH preamble or RACH message A in some examples) to the base station.

Sensing configuration 600 illustrates an example where the UE (e.g., the advanced UE configured with the plurality of ROs (including FD ROs 610)) identifies, selects, or otherwise determines which RO(s) are available (e.g., to be included in the second portion) or unavailable (e.g., to be included in the first portion) based on a system information message (e.g., a remaining minimum system information (RMSI) message 615). For example, the base station may transmit or otherwise provide the RMSI message 615 to the advanced UE that indicates or otherwise identifies which FD ROs 610 are available and/or which FD ROs 610 are unavailable. In one example, this may include the base station using a mask in the RMSI message 615 to convey the indication of which FD ROs 610 are available and/or unavailable.

The base station may configure the RMSI message 615 (e.g., using a RMSI mask) based on whether the corresponding downlink resource is going to be used. In the non-limiting example illustrated in FIG. 6, the RMSI message 615 may indicate that the first (DL_1) and third (DL_3) downlink transmissions 605 are not being used, and are therefore free or otherwise available for use by the advanced UE (e.g., to be included in the second portion of ROs). Additionally, or alternatively, the RMSI message 615 may indicate that the second (DL_2) and fourth (DL_4) downlink transmissions 605 are being used, and are therefore busy or otherwise unavailable for use by the advanced UE (e.g., to be included in the first portion of ROs).

According, the advanced UE may select a FD RO 610 from the second portion of ROs to use to transmit the random access message (e.g., the RACH preamble or message A uplink message transmission) to the base station based on monitoring for the RMSI message 615.

Figure 7:
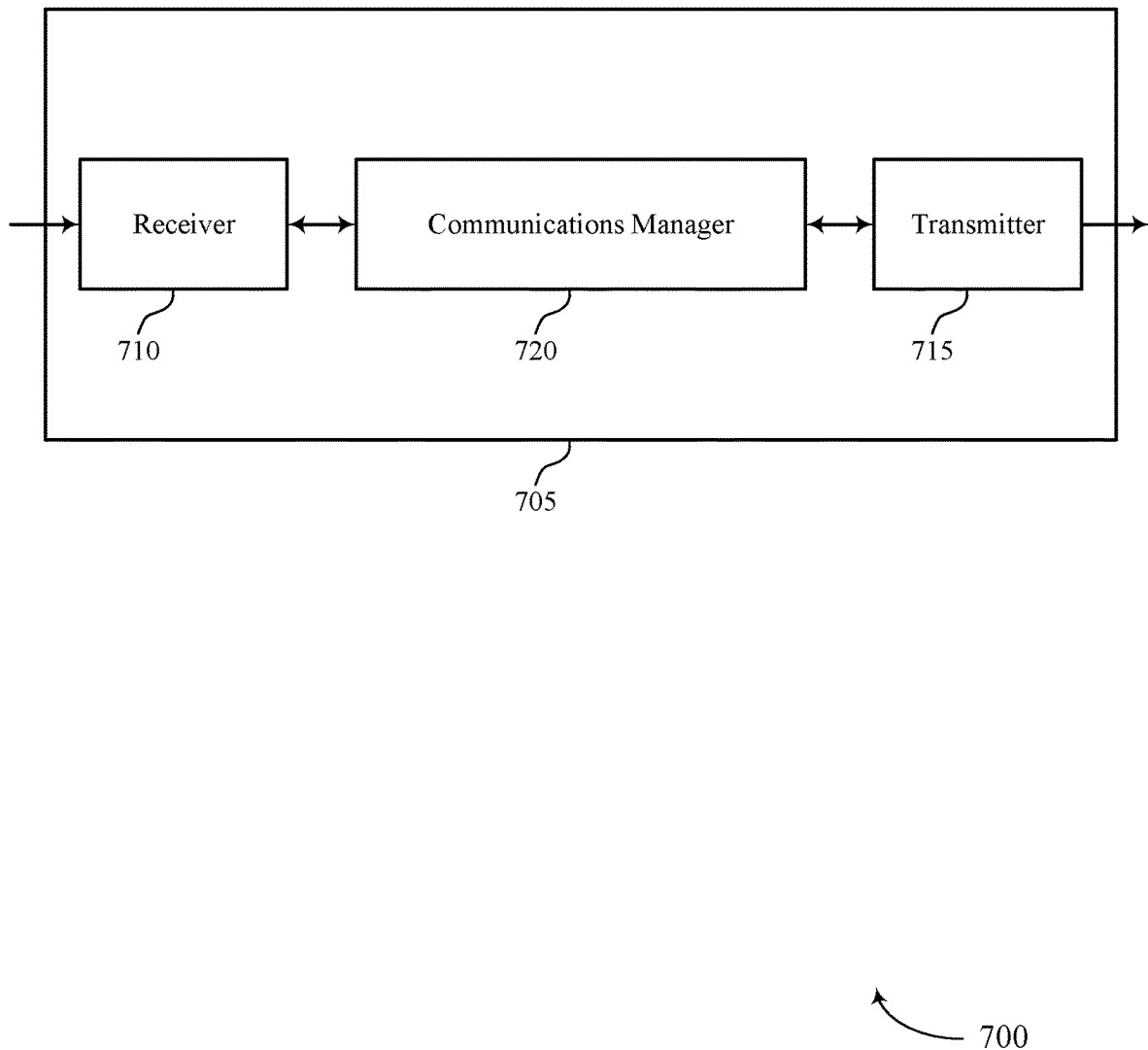
FIGS. 7 and 8 show block diagrams of devices that support initial access random access occasion-caused interference in accordance with aspects of the present disclosure.

FIG. 7 shows a block diagram 700 of a device 705 that supports initial access random access occasion-caused interference in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to initial access random access occasion-caused interference). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to initial access random access occasion-caused interference). In some examples, the transmitter 715 may be co-located with a receiver 710 in a transceiver. The transmitter 715 may utilize a single antenna or a set of multiple antennas.

The communications manager 720, the receiver 710, the transmitter 715, or various combinations thereof or various components thereof may be examples of means for performing various aspects of initial access random access occasion-caused interference as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving an indication of a set of multiple random access occasions for uplink message transmission to a base station. The communications manager 720 may be configured as or otherwise support a means for determining that a first portion of the set of multiple random access occasions is unavailable for use by the UE as a result of the base station operating in a full duplex mode. The communications manager 720 may be configured as or otherwise support a means for selecting one or more random access occasions from a second portion of the set of multiple random access occasions instead of from the first portion based on the determining. The communications manager 720 may be configured as or otherwise support a means for transmitting a random access message to the base station during the one or more random access occasions from the second portion.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for a RACH UE to dynamically identify or otherwise determine available ROs when the base station is operating in a full-duplex mode.

Figure 8:
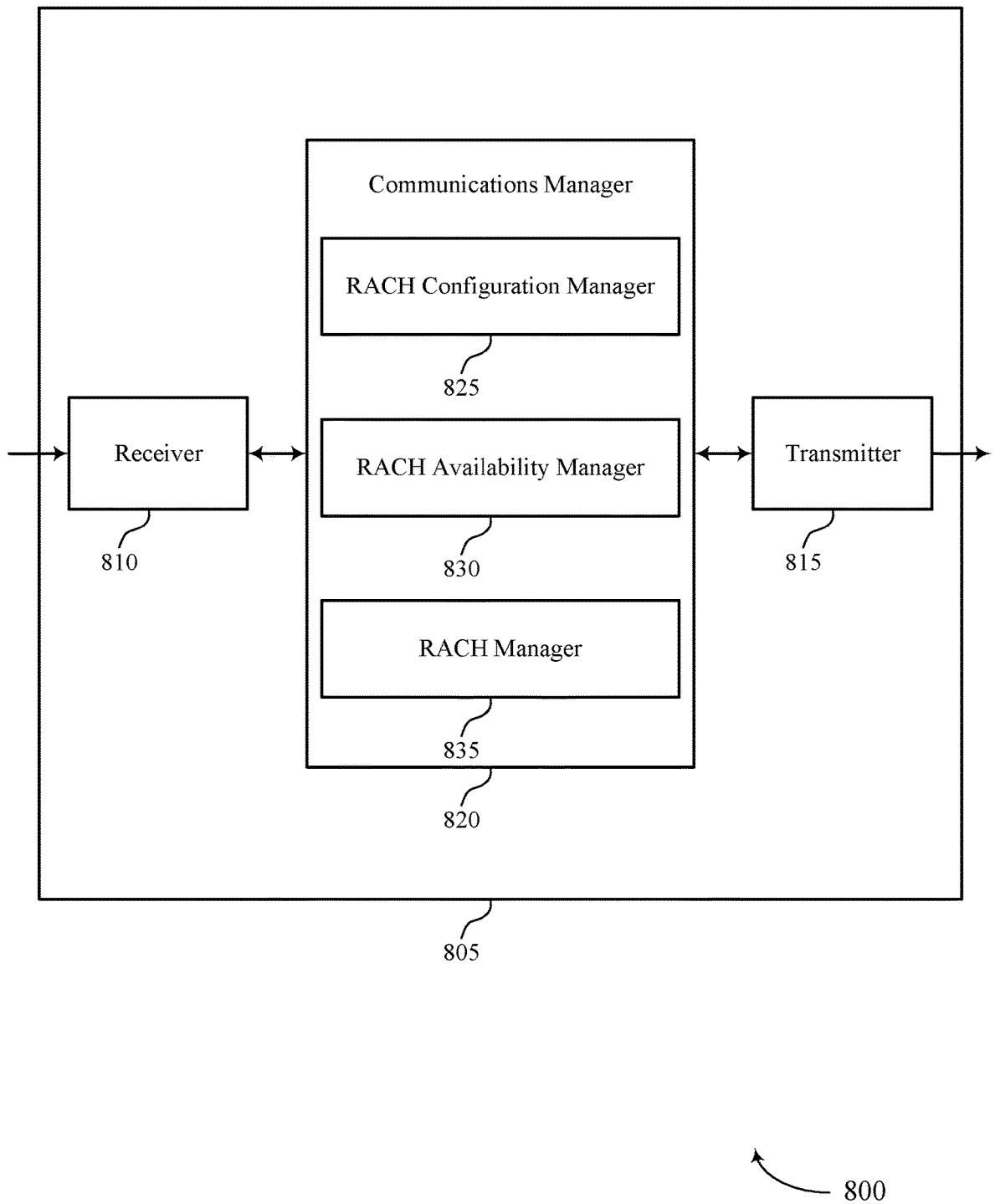

FIG. 8 shows a block diagram 800 of a device 805 that supports initial access random access occasion-caused interference in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to initial access random access occasion-caused interference). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to initial access random access occasion-caused interference). In some examples, the transmitter 815 may be co-located with a receiver 810 in a transceiver. The transmitter 815 may utilize a single antenna or a set of multiple antennas.

The device 805, or various components thereof, may be an example of means for performing various aspects of initial access random access occasion-caused interference as described herein. For example, the communications manager 820 may include a RACH configuration manager 825, a RACH availability manager 830, a RACH manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The RACH configuration manager 825 may be configured as or otherwise support a means for receiving an indication of a set of multiple random access occasions for uplink message transmission to a base station. The RACH availability manager 830 may be configured as or otherwise support a means for determining that a first portion of the set of multiple random access occasions is unavailable for use by the UE as a result of the base station operating in a full duplex mode. The RACH availability manager 830 may be configured as or otherwise support a means for selecting one or more random access occasions from a second portion of the set of multiple random access occasions instead of from the first portion based on the determining. The RACH manager 835 may be configured as or otherwise support a means for transmitting a random access message to the base station during the one or more random access occasions from the second portion.

Figure 9:
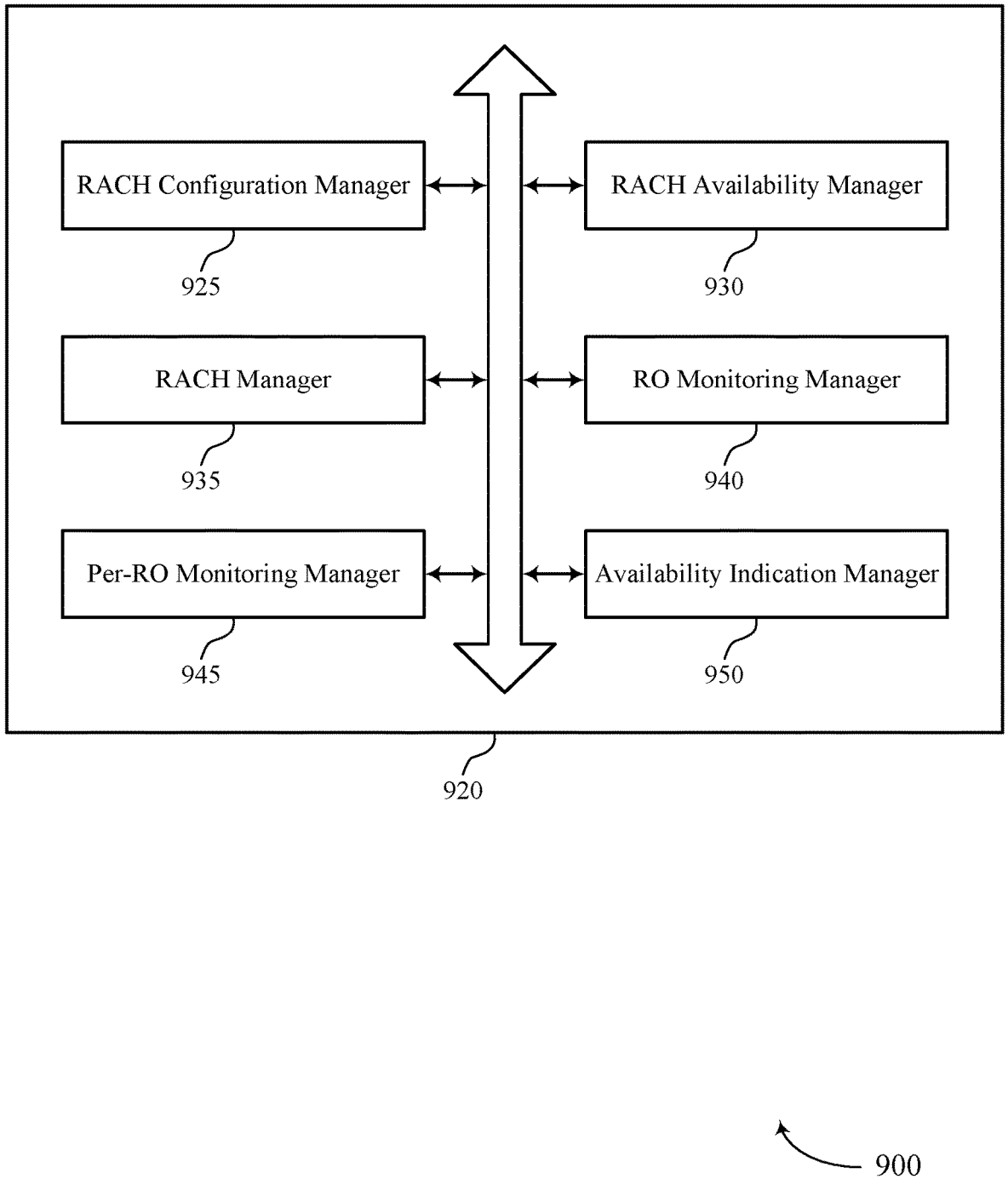
FIG. 9 shows a block diagram of a communications manager that supports initial access random access occasion-caused interference in accordance with aspects of the present disclosure.

FIG. 9 shows a block diagram 900 of a communications manager 920 that supports initial access random access occasion-caused interference in accordance with aspects of the present disclosure. The communications manager 920 may be an example of aspects of a communications manager 720, a communications manager 820, or both, as described herein. The communications manager 920, or various components thereof, may be an example of means for performing various aspects of initial access random access occasion-caused interference as described herein. For example, the communications manager 920 may include a RACH configuration manager 925, a RACH availability manager 930, a RACH manager 935, a RO monitoring manager 940, a per-RO monitoring manager 945, an availability indication manager 950, or any combination thereof. Each of these components may communicate, directly or indirectly, with one another (e.g., via one or more buses).

The communications manager 920 may support wireless communication at a UE in accordance with examples as disclosed herein. The RACH configuration manager 925 may be configured as or otherwise support a means for receiving an indication of a set of multiple random access occasions for uplink message transmission to a base station. The RACH availability manager 930 may be configured as or otherwise support a means for determining that a first portion of the set of multiple random access occasions is unavailable for use by the UE as a result of the base station operating in a full duplex mode. In some examples, the RACH availability manager 930 may be configured as or otherwise support a means for selecting one or more random access occasions from a second portion of the set of multiple random access occasions instead of from the first portion based on the determining. The RACH manager 935 may be configured as or otherwise support a means for transmitting a random access message to the base station during the one or more random access occasions from the second portion.

In some examples, to support determining that the first portion of the set of multiple random access occasions is unavailable, the RO monitoring manager 940 may be configured as or otherwise support a means for monitoring for an interference level associated with a second UE transmitting an uplink message to the base station, where the monitoring occurs prior to the set of multiple random access occasions.

In some examples, to support monitoring the interference level, the RO monitoring manager 940 may be configured as or otherwise support a means for monitoring one or more uplink feedback transmissions from the second UE to the base station. In some examples, to support monitoring the interference level, the RO monitoring manager 940 may be configured as or otherwise support a means for determining the interference level based on the monitoring.

In some examples, to support determining that the first portion of the set of multiple random access occasions is unavailable, the RO monitoring manager 940 may be configured as or otherwise support a means for selecting the one or more random access occasions from the second portion of the set of multiple random access occasions based on the interference level satisfying an interference threshold. In some examples, the first portion of the set of multiple random access occasions includes full-duplex random access occasions and the second portion of the set of multiple random access occasions includes half-duplex random access occasions or the second portion of the set of multiple random access occasions includes the full-duplex random access occasions and the half-duplex random access occasions.

In some examples, to support monitoring the interference level, the RO monitoring manager 940 may be configured as or otherwise support a means for receiving an indication of a transmission power of the uplink message transmitted by the second UE. In some examples, to support monitoring the interference level, the RO monitoring manager 940 may be configured as or otherwise support a means for determining a pathloss for a channel between the UE and the second UE based on the uplink message from the second UE to the base station. In some examples, to support monitoring the interference level, the RO monitoring manager 940 may be configured as or otherwise support a means for identifying the interference level based on the pathloss.

In some examples, to support monitoring for the interference level, the RO monitoring manager 940 may be configured as or otherwise support a means for determining a first interference level for a first set of random access occasions of the set of multiple random access occasions, where the first set of random access occasions is within a first subband. In some examples, to support monitoring for the interference level, the RO monitoring manager 940 may be configured as or otherwise support a means for determining a second interference level for a second set of random access occasions of the set of multiple random access occasions, where the second set of random access occasions is within a second subband, where selecting the one or more random access occasions from the second portion of the set of multiple random access occasions is based on at least one of the first interference level or the second interference level, and an interference threshold.

In some examples, to support determining that the first portion of the set of multiple random access occasions is unavailable for use by the UE, the RO monitoring manager 940 may be configured as or otherwise support a means for identifying a highest total RSSI per uplink symbol among all uplink symbols within both the first subband and the second subband. In some examples, to support determining that the first portion of the set of multiple random access occasions is unavailable for use by the UE, the RO monitoring manager 940 may be configured as or otherwise support a means for comparing the highest total RSSI per uplink symbol from each of the first subband and the second subband with the interference threshold. In some examples, to support determining that the first portion of the set of multiple random access occasions is unavailable for use by the UE, the RO monitoring manager 940 may be configured as or otherwise support a means for determining whether the first set of random access occasions, the second set of random access occasions, or both, is unavailable as the first portion of the set of multiple random access occasions or is available as the second portion of the set of multiple random access occasions based on the comparing.

In some examples, to support determining that the first portion of the set of multiple random access occasions is unavailable, the per-RO monitoring manager 945 may be configured as or otherwise support a means for monitoring each of the set of multiple random access occasions for an interference level, where the set of multiple random access occasions are full-duplex random access occasions.

In some examples, to support monitoring of each of the set of multiple random access occasions for the interference level, the per-RO monitoring manager 945 may be configured as or otherwise support a means for monitoring for a reference signal from the base station, where the first portion of random access occasions have interference levels based on detection of the reference signal during the first portion of random access occasions, and where the second portion of random access occasions have interference levels based on a lack of detection of the reference signal during the second portion of random access occasions. In some examples, the first portion of random access occasions have interference levels above an interference level threshold. In some examples, the second portion of random access occasions have interference levels below the interference level threshold.

In some examples, to support determining that the first portion of the set of multiple random access occasions is unavailable, the availability indication manager 950 may be configured as or otherwise support a means for receiving a system information message from the base station indicating, for each random access occasion in the set of multiple random access occasions, whether the random access occasion is included in the first portion of the set of multiple random access occasions as unavailable or included in the second portion of the set of multiple random access occasions as available.

Figure 10:
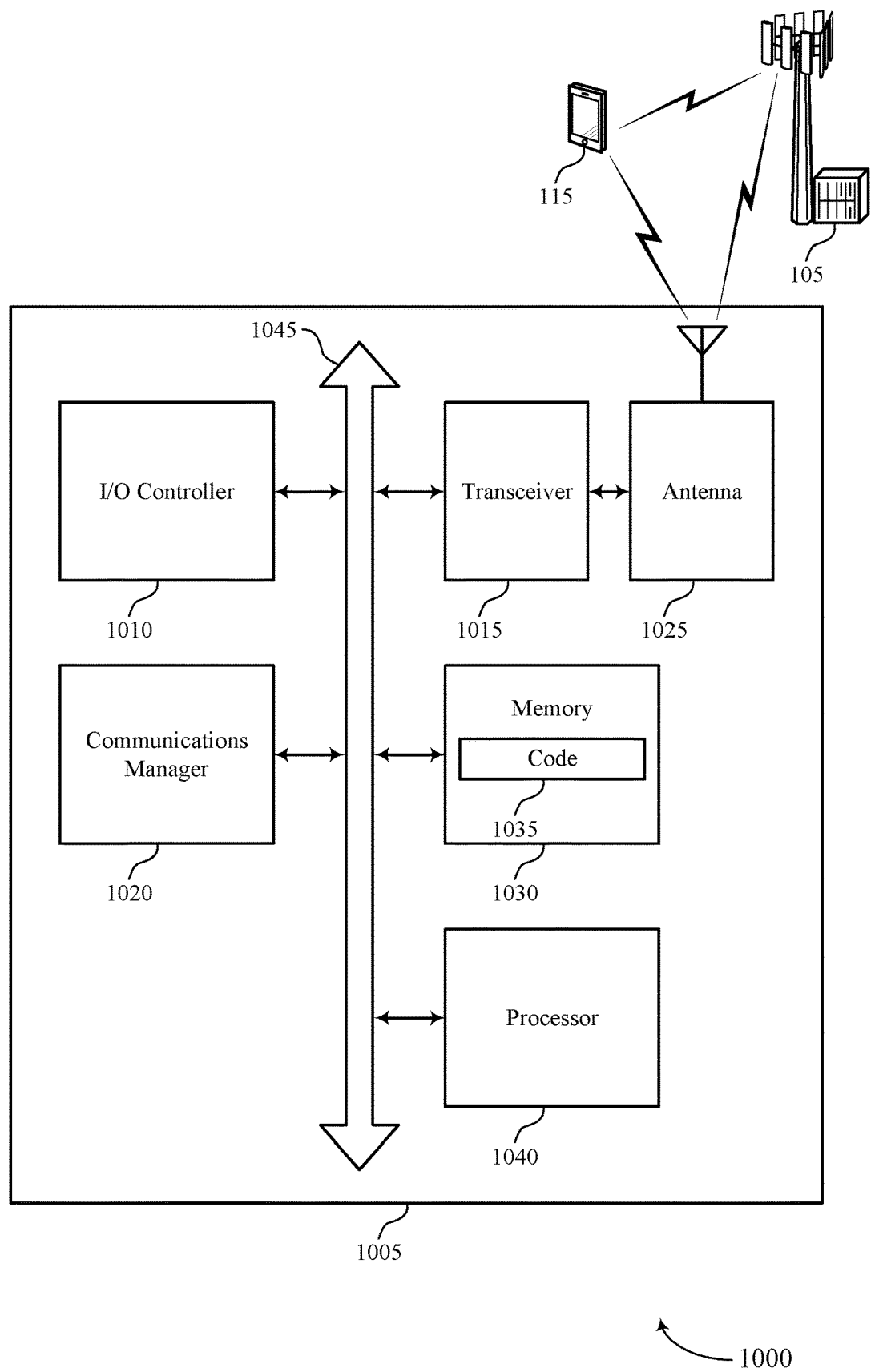
FIG. 10 shows a diagram of a system including a device that supports initial access random access occasion-caused interference in accordance with aspects of the present disclosure.

FIG. 10 shows a diagram of a system 1000 including a device 1005 that supports initial access random access occasion-caused interference in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting initial access random access occasion-caused interference). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving an indication of a set of multiple random access occasions for uplink message transmission to a base station. The communications manager 1020 may be configured as or otherwise support a means for determining that a first portion of the set of multiple random access occasions is unavailable for use by the UE as a result of the base station operating in a full duplex mode. The communications manager 1020 may be configured as or otherwise support a means for selecting one or more random access occasions from a second portion of the set of multiple random access occasions instead of from the first portion based on the determining. The communications manager 1020 may be configured as or otherwise support a means for transmitting a random access message to the base station during the one or more random access occasions from the second portion.

By including or configuring the communications manager 1020 in accordance with examples as described herein, the device 1005 may support techniques for a RACH UE to dynamically identify or otherwise determine available ROs when the base station is operating in a full-duplex mode.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of initial access random access occasion-caused interference as described herein, or the processor 1040 and the memory 1030 may be otherwise configured to perform or support such operations.

Figure 11:
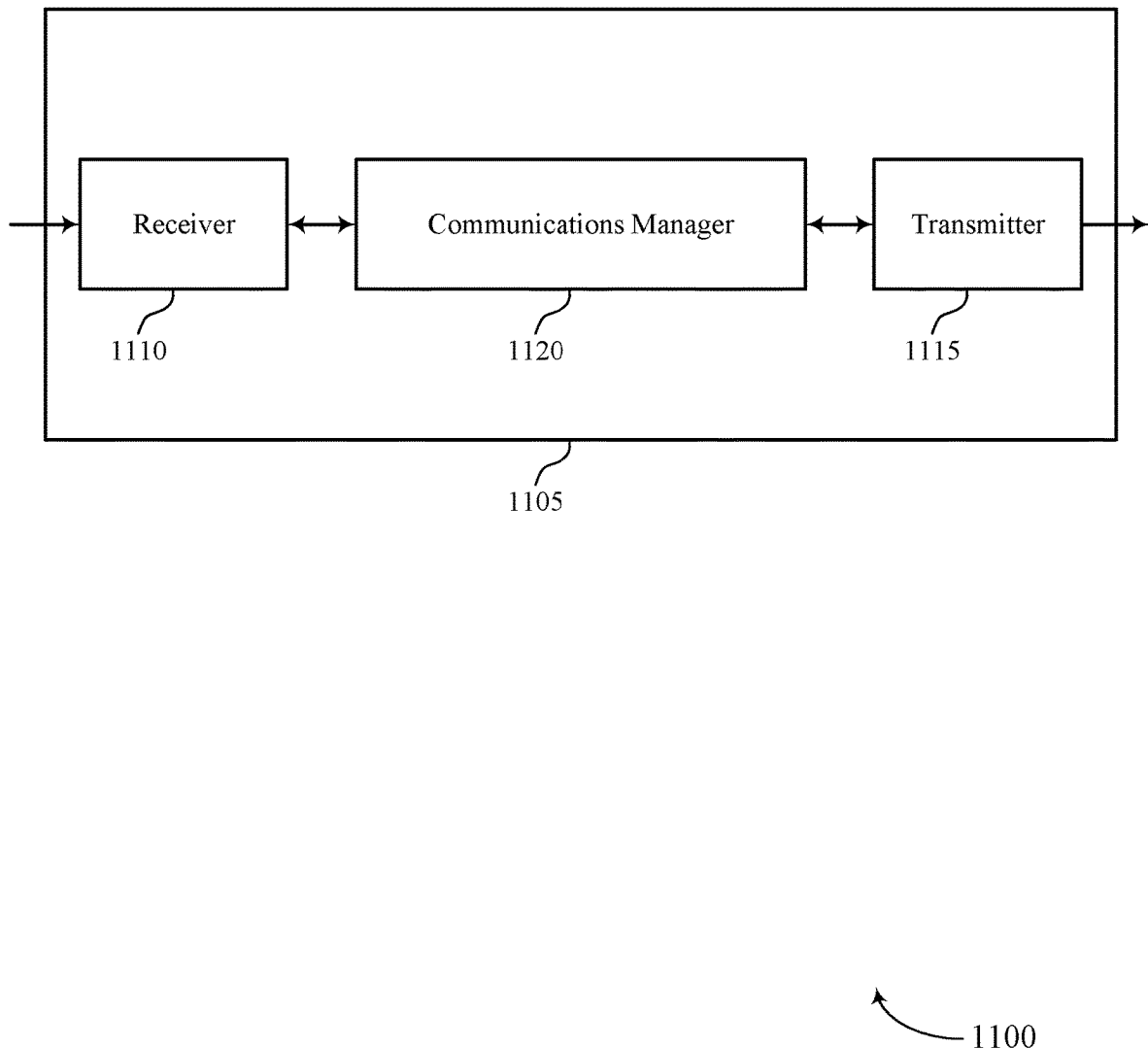
FIGS. 11 and 12 show block diagrams of devices that support initial access random access occasion-caused interference in accordance with aspects of the present disclosure.

FIG. 11 shows a block diagram 1100 of a device 1105 that supports initial access random access occasion-caused interference in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to initial access random access occasion-caused interference). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to initial access random access occasion-caused interference). In some examples, the transmitter 1115 may be co-located with a receiver 1110 in a transceiver. The transmitter 1115 may utilize a single antenna or a set of multiple antennas.

The communications manager 1120, the receiver 1110, the transmitter 1115, or various combinations thereof or various components thereof may be examples of means for performing various aspects of initial access random access occasion-caused interference as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting an indication of a set of multiple random access occasions for an uplink message transmission from a UE to the base station. The communications manager 1120 may be configured as or otherwise support a means for receiving a random access message from the UE during one or more random access occasions from a second portion of the set of multiple random access occasions instead of from a first portion of the set of multiple random access occasions, where the first portion of the set of multiple random access occasions is unavailable for use by the UE as a result of the base station operating in a full duplex mode.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for a RACH UE to dynamically identify or otherwise determine available ROs when the base station is operating in a full-duplex mode.

Figure 12:
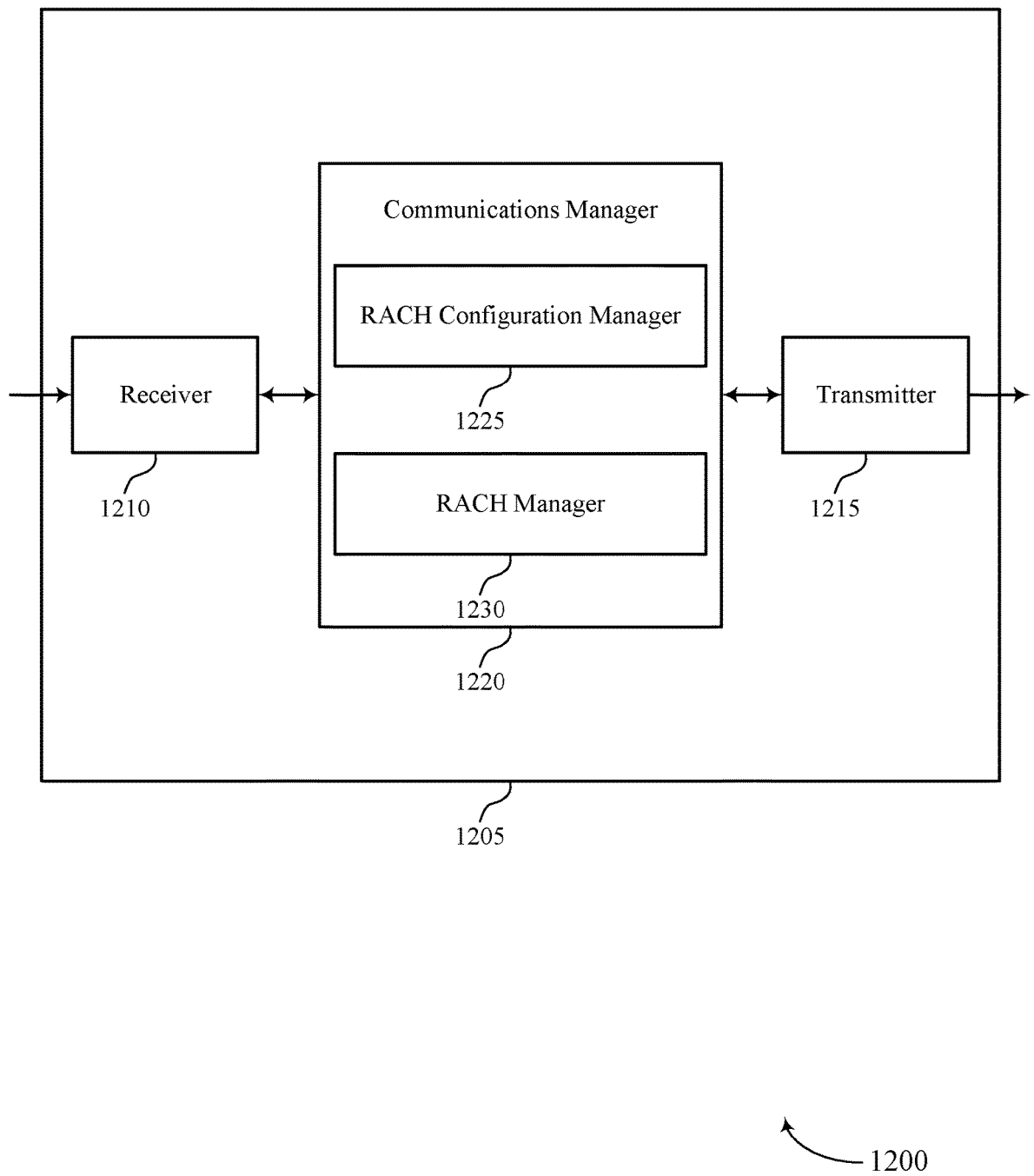

FIG. 12 shows a block diagram 1200 of a device 1205 that supports initial access random access occasion-caused interference in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to initial access random access occasion-caused interference). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to initial access random access occasion-caused interference). In some examples, the transmitter 1215 may be co-located with a receiver 1210 in a transceiver. The transmitter 1215 may utilize a single antenna or a set of multiple antennas.

The device 1205, or various components thereof, may be an example of means for performing various aspects of initial access random access occasion-caused interference as described herein. For example, the communications manager 1220 may include a RACH configuration manager 1225 a RACH manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The RACH configuration manager 1225 may be configured as or otherwise support a means for transmitting an indication of a set of multiple random access occasions for an uplink message transmission from a UE to the base station. The RACH manager 1230 may be configured as or otherwise support a means for receiving a random access message from the UE during one or more random access occasions from a second portion of the set of multiple random access occasions instead of from a first portion of the set of multiple random access occasions, where the first portion of the set of multiple random access occasions is unavailable for use by the UE as a result of the base station operating in a full duplex mode.

Figure 13:
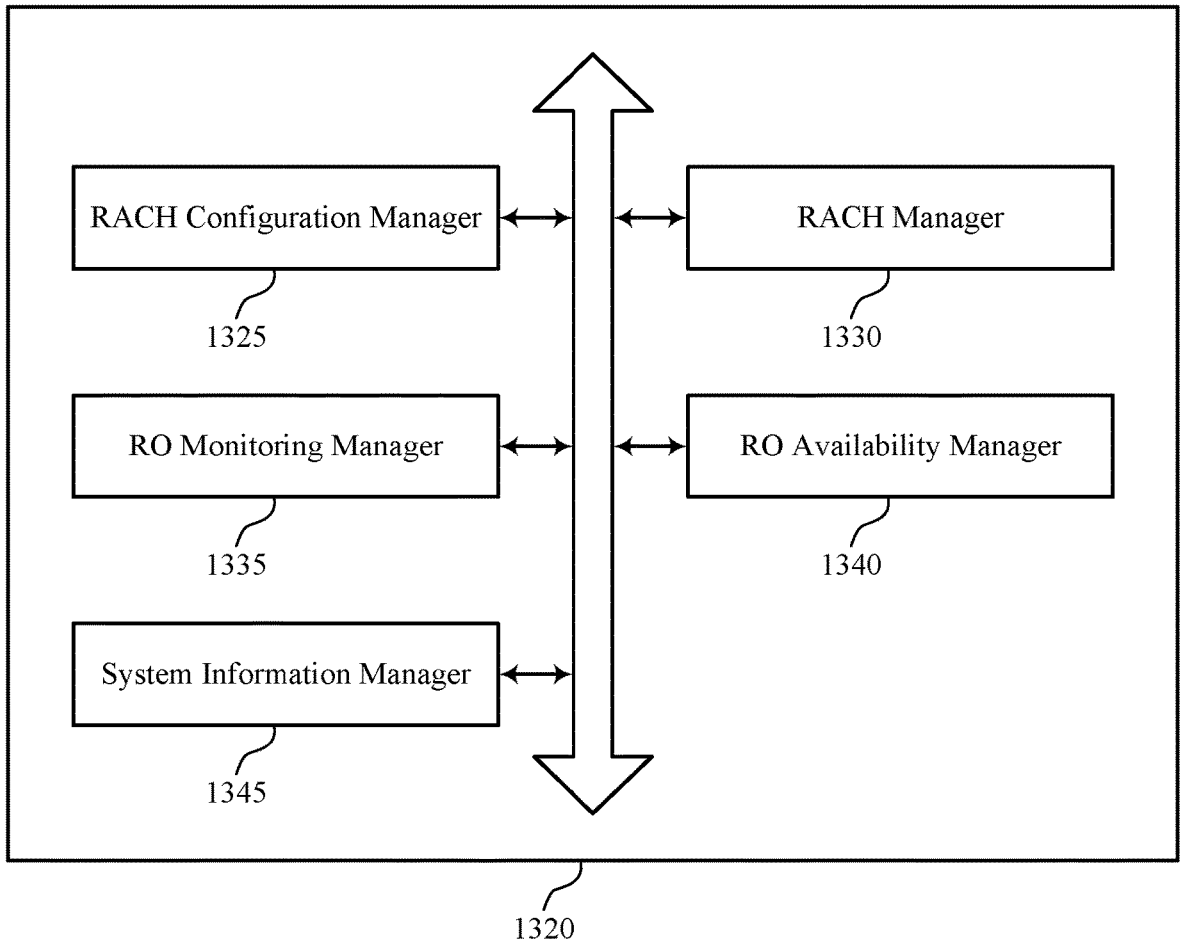
FIG. 13 shows a block diagram of a communications manager that supports initial access random access occasion-caused interference in accordance with aspects of the present disclosure.

FIG. 13 shows a block diagram 1300 of a communications manager 1320 that supports initial access random access occasion-caused interference in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of initial access random access occasion-caused interference as described herein. For example, the communications manager 1320 may include a RACH configuration manager 1325, a RACH manager 1330, a RO monitoring manager 1335, a RO availability manager 1340, a system information manager 1345, or any combination thereof. Each of these components may communicate, directly or indirectly, with one another (e.g., via one or more buses).

The communications manager 1320 may support wireless communication at a base station in accordance with examples as disclosed herein. The RACH configuration manager 1325 may be configured as or otherwise support a means for transmitting an indication of a set of multiple random access occasions for an uplink message transmission from a UE to the base station. The RACH manager 1330 may be configured as or otherwise support a means for receiving a random access message from the UE during one or more random access occasions from a second portion of the set of multiple random access occasions instead of from a first portion of the set of multiple random access occasions, where the first portion of the set of multiple random access occasions is unavailable for use by the UE as a result of the base station operating in a full duplex mode.

In some examples, the RO monitoring manager 1335 may be configured as or otherwise support a means for receiving one or more uplink feedback transmissions from a second UE, where the first portion of the set of multiple random access occasions is unavailable for use by the UE based on an interference level associated with the one or more uplink feedback transmissions satisfying an interference threshold, where the one or more uplink feedback transmissions from the second UE occur prior to the set of multiple random access occasions.

In some examples, the RO monitoring manager 1335 may be configured as or otherwise support a means for transmitting, to the UE, an indication of a transmission power of the one or more uplink feedback transmissions performed by the second UE. In some examples, the first portion of the set of multiple random access occasions includes full-duplex random access occasions and the second portion of the set of multiple random access occasions includes half-duplex random access occasions or the second portion of the set of multiple random access occasions include the full-duplex random access occasions and the half-duplex random access occasions.

In some examples, the RO availability manager 1340 may be configured as or otherwise support a means for identifying a downlink transmission from the base station that overlaps in a time domain with a random access occasion of the set of multiple random access occasions. In some examples, the RO availability manager 1340 may be configured as or otherwise support a means for transmitting a reference signal accompanying the downlink transmission, where the set of multiple random access occasions are full-duplex random access occasions.

In some examples, the system information manager 1345 may be configured as or otherwise support a means for identifying one or more downlink transmissions from the base station that overlap in a time domain with a corresponding random access occasion of the set of multiple random access occasions. In some examples, the system information manager 1345 may be configured as or otherwise support a means for transmitting a system information message to the UE indicating, for each random access occasion in the set of multiple random access occasions, whether the random access occasion is included in the first portion of the set of multiple random access occasions as unavailable or included in the second portion of the random access occasions as available based on the overlap.

Figure 14:
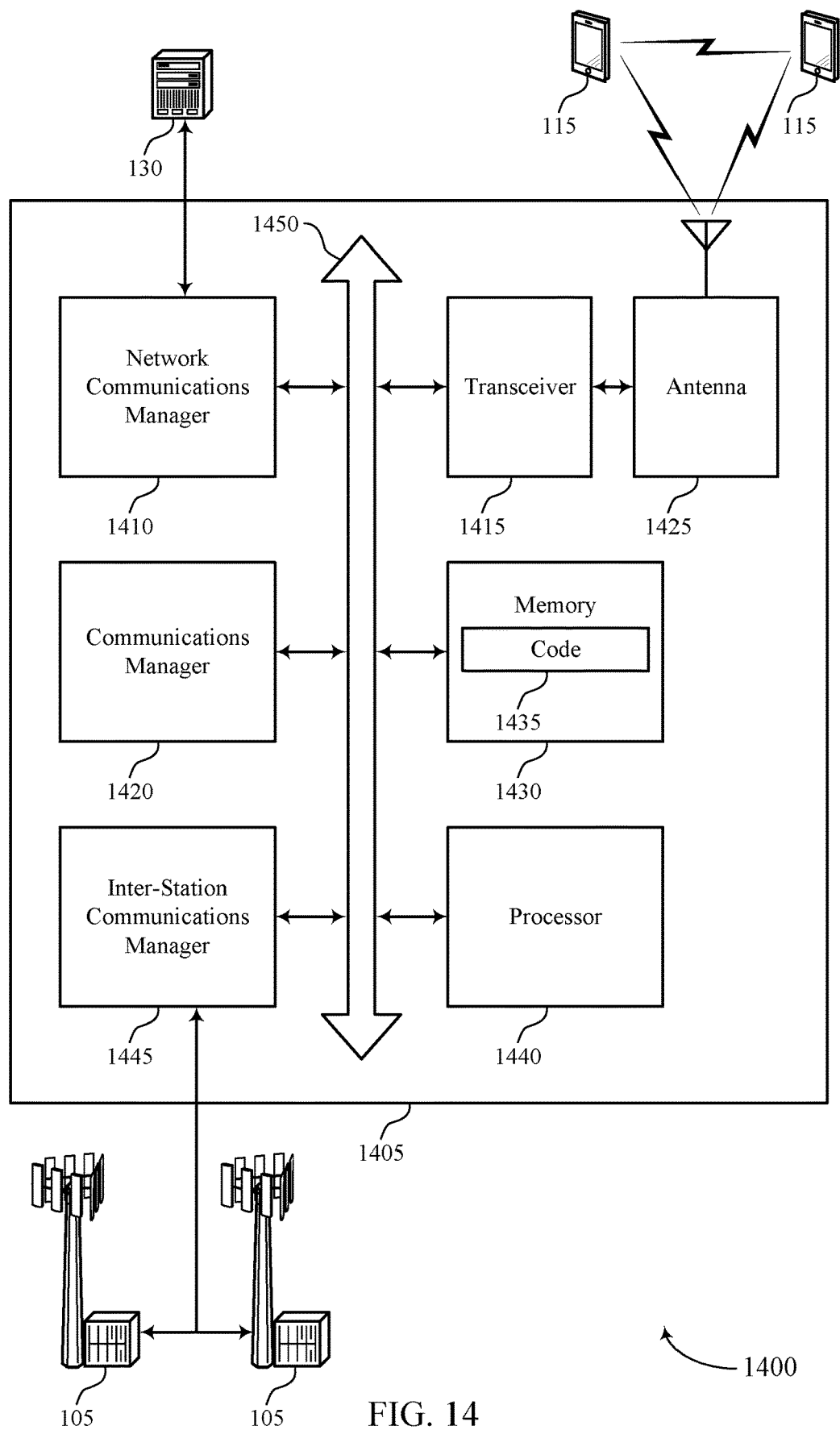
FIG. 14 shows a diagram of a system including a device that supports initial access random access occasion-caused interference in accordance with aspects of the present disclosure.

FIG. 14 shows a diagram of a system 1400 including a device 1405 that supports initial access random access occasion-caused interference in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting initial access random access occasion-caused interference). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting an indication of a set of multiple random access occasions for an uplink message transmission from a UE to the base station. The communications manager 1420 may be configured as or otherwise support a means for receiving a random access message from the UE during one or more random access occasions from a second portion of the set of multiple random access occasions instead of from a first portion of the set of multiple random access occasions, where the first portion of the set of multiple random access occasions is unavailable for use by the UE as a result of the base station operating in a full duplex mode.

By including or configuring the communications manager 1420 in accordance with examples as described herein, the device 1405 may support techniques for a RACH UE to dynamically identify or otherwise determine available ROs when the base station is operating in a full-duplex mode.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of initial access random access occasion-caused interference as described herein, or the processor 1440 and the memory 1430 may be otherwise configured to perform or support such operations.

Figure 15:
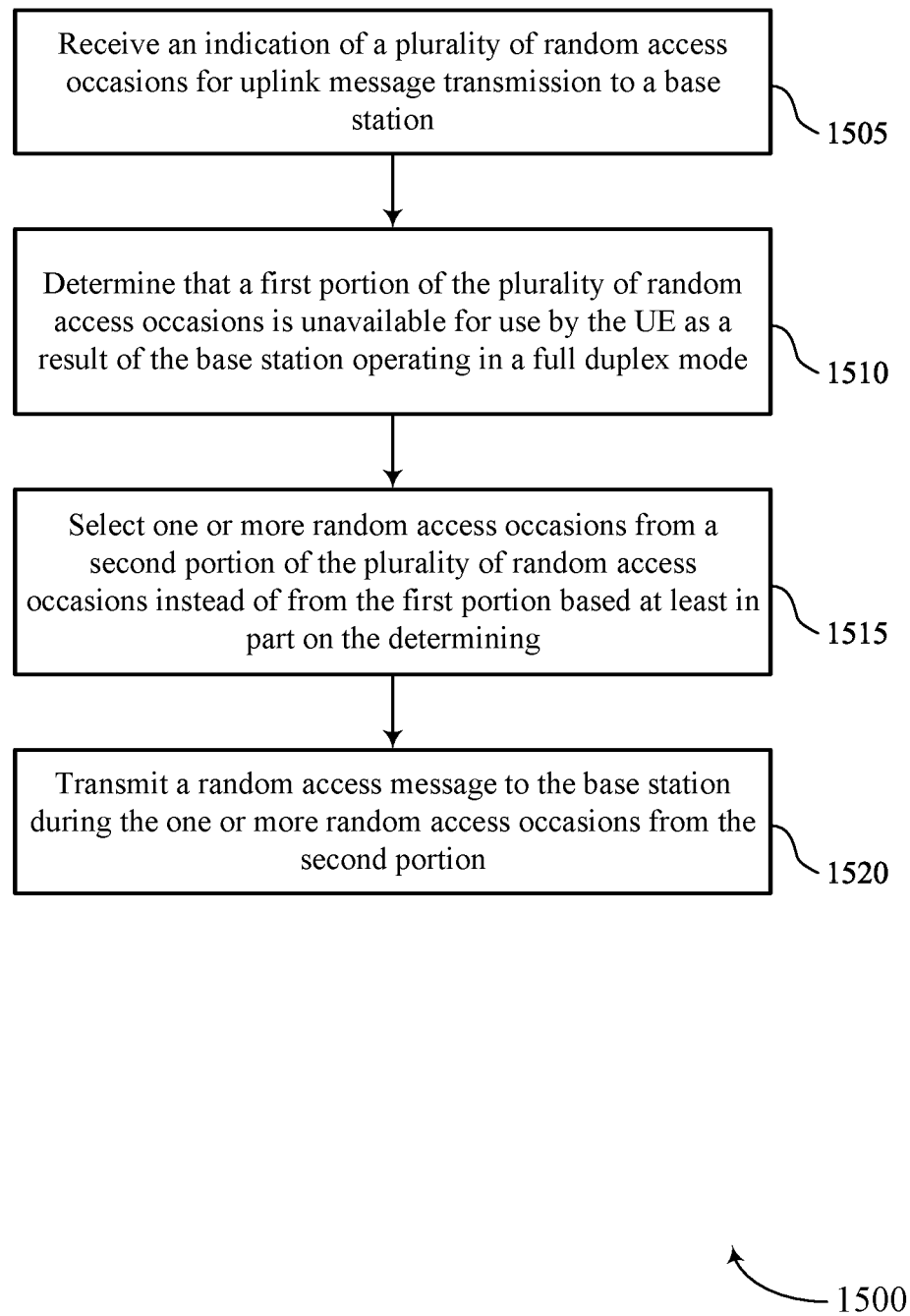
FIGS. 15 through 19 show flowcharts illustrating methods that support initial access random access occasion-caused interference in accordance with aspects of the present disclosure.

FIG. 15 shows a flowchart illustrating a method 1500 that supports initial access random access occasion-caused interference in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving an indication of a set of multiple random access occasions for uplink message transmission to a base station. The operations of 1505 may be performed in accordance with examples as disclosed herein. In some examples, aspects of the operations of 1505 may be performed by a RACH configuration manager 925 as described with reference to FIG. 9.

At 1510, the method may include determining that a first portion of the set of multiple random access occasions is unavailable for use by the UE as a result of the base station operating in a full duplex mode. The operations of 1510 may be performed in accordance with examples as disclosed herein. In some examples, aspects of the operations of 1510 may be performed by a RACH availability manager 930 as described with reference to FIG. 9.

At 1515, the method may include selecting one or more random access occasions from a second portion of the set of multiple random access occasions instead of from the first portion based on the determining. The operations of 1515 may be performed in accordance with examples as disclosed herein. In some examples, aspects of the operations of 1515 may be performed by a RACH availability manager 930 as described with reference to FIG. 9.

At 1520, the method may include transmitting a random access message to the base station during the one or more random access occasions from the second portion. The operations of 1520 may be performed in accordance with examples as disclosed herein. In some examples, aspects of the operations of 1520 may be performed by a RACH manager 935 as described with reference to FIG. 9.

Figure 16:
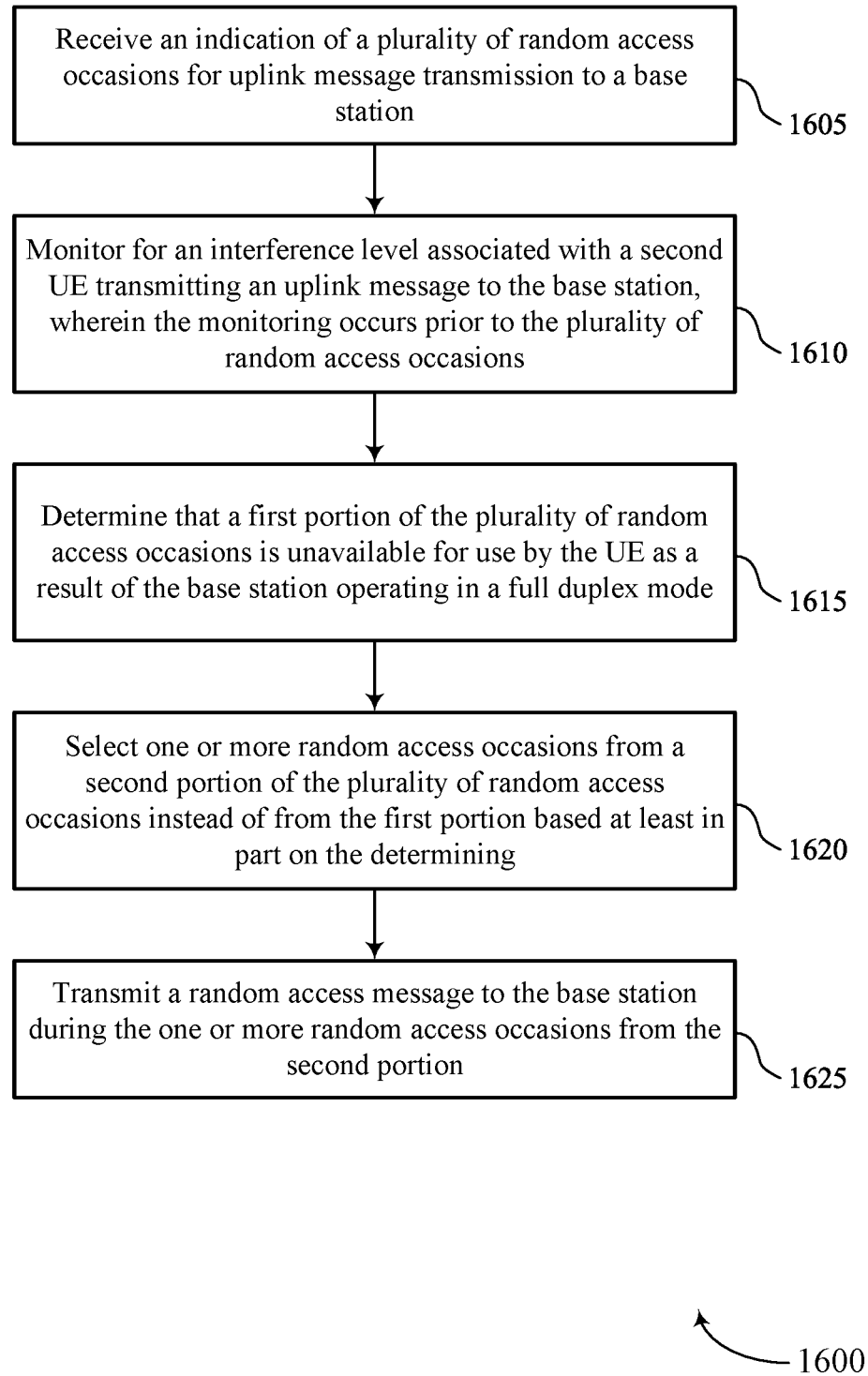

FIG. 16 shows a flowchart illustrating a method 1600 that supports initial access random access occasion-caused interference in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving an indication of a set of multiple random access occasions for uplink message transmission to a base station. The operations of 1605 may be performed in accordance with examples as disclosed herein. In some examples, aspects of the operations of 1605 may be performed by a RACH configuration manager 925 as described with reference to FIG. 9.

At 1610, the method may include monitoring for an interference level associated with a second UE transmitting an uplink message to the base station, where the monitoring occurs prior to the set of multiple random access occasions. The operations of 1610 may be performed in accordance with examples as disclosed herein. In some examples, aspects of the operations of 1610 may be performed by a RO monitoring manager 940 as described with reference to FIG. 9.

At 1615, the method may include determining that a first portion of the set of multiple random access occasions is unavailable for use by the UE as a result of the base station operating in a full duplex mode. The operations of 1615 may be performed in accordance with examples as disclosed herein. In some examples, aspects of the operations of 1615 may be performed by a RACH availability manager 930 as described with reference to FIG. 9.

At 1620, the method may include selecting one or more random access occasions from a second portion of the set of multiple random access occasions instead of from the first portion based on the determining. The operations of 1620 may be performed in accordance with examples as disclosed herein. In some examples, aspects of the operations of 1620 may be performed by a RACH availability manager 930 as described with reference to FIG. 9.

At 1625, the method may include transmitting a random access message to the base station during the one or more random access occasions from the second portion. The operations of 1625 may be performed in accordance with examples as disclosed herein. In some examples, aspects of the operations of 1625 may be performed by a RACH manager 935 as described with reference to FIG. 9.

Figure 17:
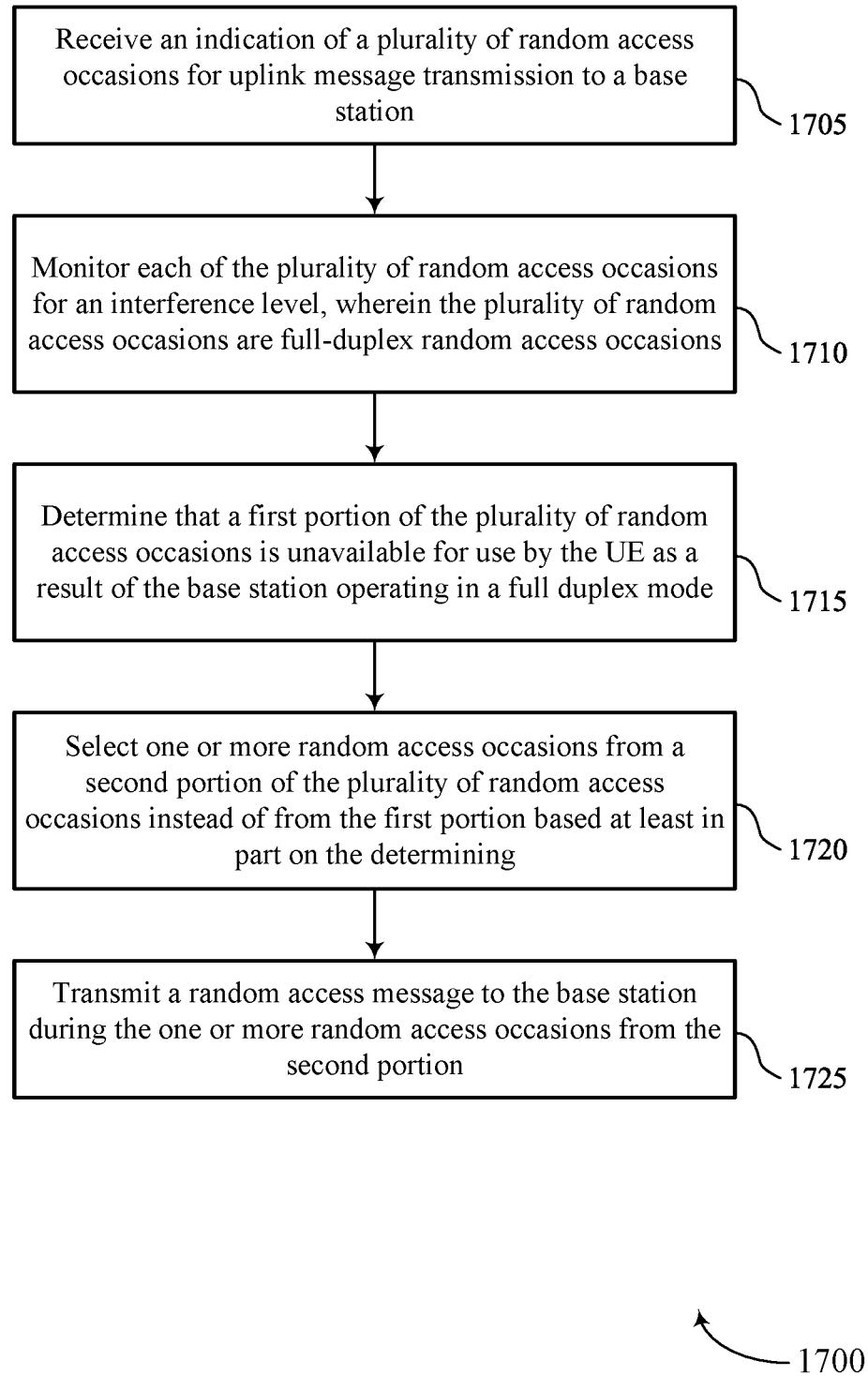

FIG. 17 shows a flowchart illustrating a method 1700 that supports initial access random access occasion-caused interference in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving an indication of a set of multiple random access occasions for uplink message transmission to a base station. The operations of 1705 may be performed in accordance with examples as disclosed herein. In some examples, aspects of the operations of 1705 may be performed by a RACH configuration manager 925 as described with reference to FIG. 9.

At 1710, the method may include monitoring each of the set of multiple random access occasions for an interference level, where the set of multiple random access occasions are full-duplex random access occasions. The operations of 1710 may be performed in accordance with examples as disclosed herein. In some examples, aspects of the operations of 1710 may be performed by a per-RO monitoring manager 945 as described with reference to FIG. 9.

At 1715, the method may include determining that a first portion of the set of multiple random access occasions is unavailable for use by the UE as a result of the base station operating in a full duplex mode. The operations of 1715 may be performed in accordance with examples as disclosed herein. In some examples, aspects of the operations of 1715 may be performed by a RACH availability manager 930 as described with reference to FIG. 9.

At 1720, the method may include selecting one or more random access occasions from a second portion of the set of multiple random access occasions instead of from the first portion based on the determining. The operations of 1720 may be performed in accordance with examples as disclosed herein. In some examples, aspects of the operations of 1720 may be performed by a RACH availability manager 930 as described with reference to FIG. 9.

At 1725, the method may include transmitting a random access message to the base station during the one or more random access occasions from the second portion. The operations of 1725 may be performed in accordance with examples as disclosed herein. In some examples, aspects of the operations of 1725 may be performed by a RACH manager 935 as described with reference to FIG. 9.

Figure 18:
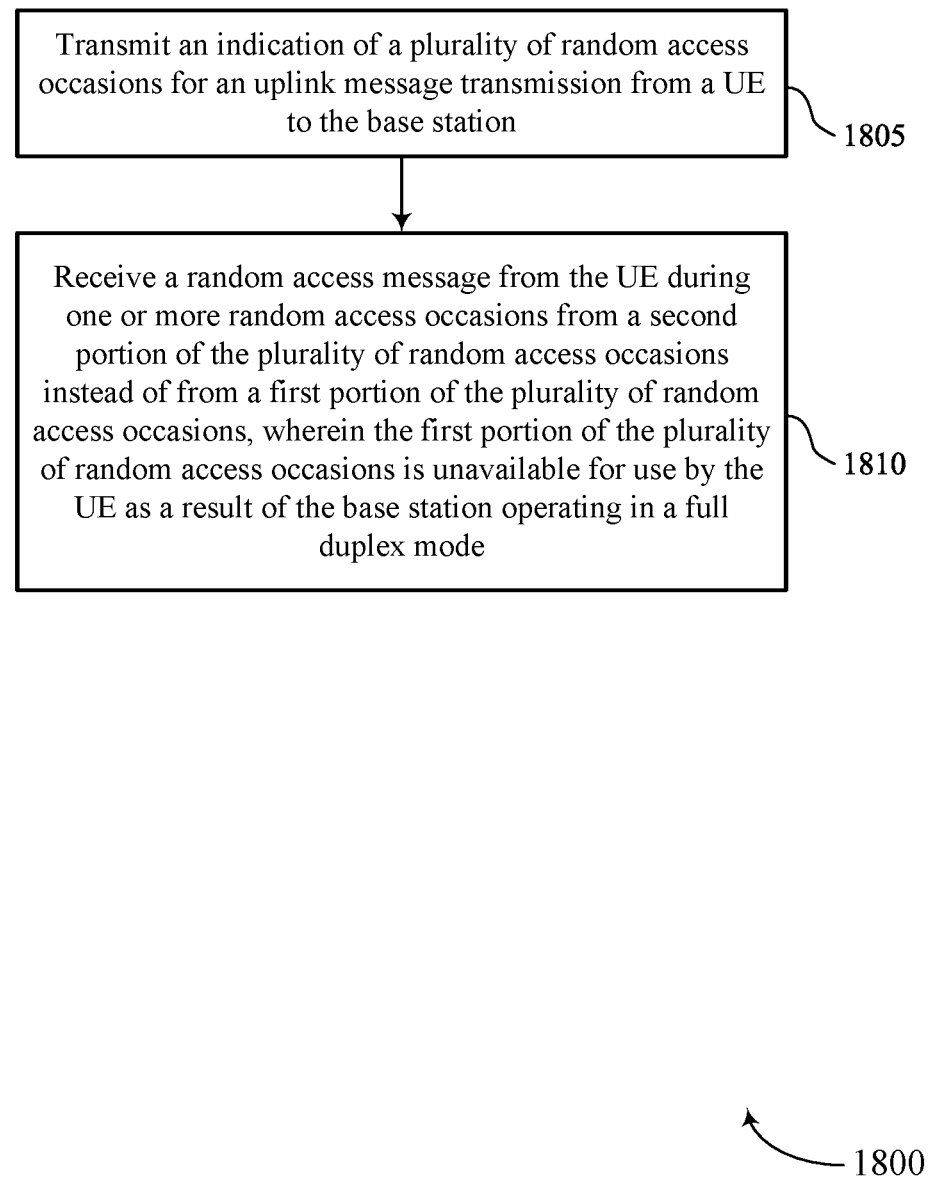

FIG. 18 shows a flowchart illustrating a method 1800 that supports initial access random access occasion-caused interference in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting an indication of a set of multiple random access occasions for an uplink message transmission from a UE to the base station. The operations of 1805 may be performed in accordance with examples as disclosed herein. In some examples, aspects of the operations of 1805 may be performed by a RACH configuration manager 1325 as described with reference to FIG. 13.

At 1810, the method may include receiving a random access message from the UE during one or more random access occasions from a second portion of the set of multiple random access occasions instead of from a first portion of the set of multiple random access occasions, where the first portion of the set of multiple random access occasions is unavailable for use by the UE as a result of the base station operating in a full duplex mode. The operations of 1810 may be performed in accordance with examples as disclosed herein. In some examples, aspects of the operations of 1810 may be performed by a RACH manager 1330 as described with reference to FIG. 13.

Figure 19:
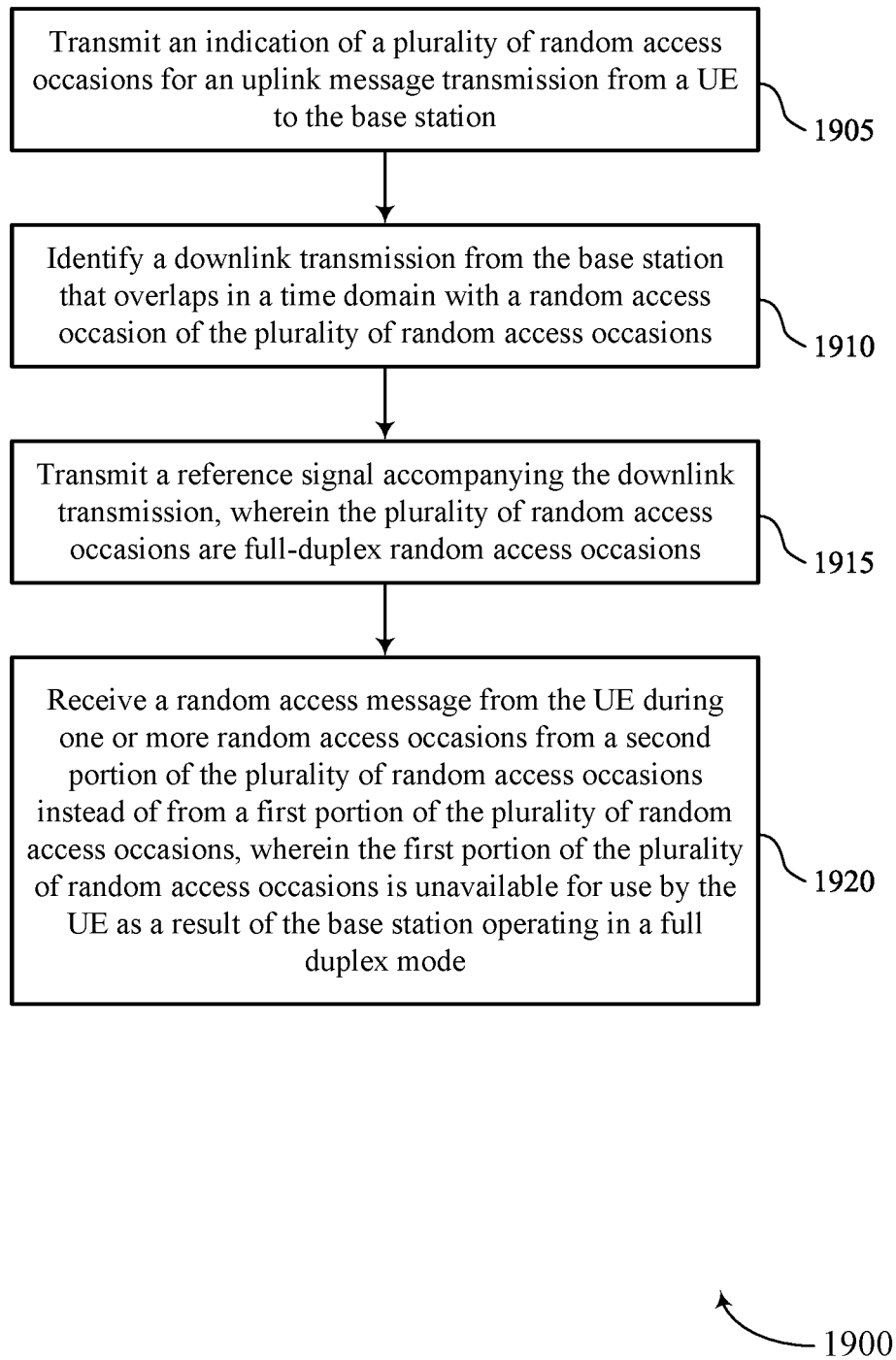

FIG. 19 shows a flowchart illustrating a method 1900 that supports initial access random access occasion-caused interference in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting an indication of a set of multiple random access occasions for an uplink message transmission from a UE to the base station. The operations of 1905 may be performed in accordance with examples as disclosed herein. In some examples, aspects of the operations of 1905 may be performed by a RACH configuration manager 1325 as described with reference to FIG. 13.

At 1910, the method may include identifying a downlink transmission from the base station that overlaps in a time domain with a random access occasion of the set of multiple random access occasions. The operations of 1910 may be performed in accordance with examples as disclosed herein. In some examples, aspects of the operations of 1910 may be performed by a RO availability manager 1340 as described with reference to FIG. 13.

At 1915, the method may include transmitting a reference signal accompanying the downlink transmission, where the set of multiple random access occasions are full-duplex random access occasions. The operations of 1915 may be performed in accordance with examples as disclosed herein. In some examples, aspects of the operations of 1915 may be performed by a RO availability manager 1340 as described with reference to FIG. 13.

At 1920, the method may include receiving a random access message from the UE during one or more random access occasions from a second portion of the set of multiple random access occasions instead of from a first portion of the set of multiple random access occasions, where the first portion of the set of multiple random access occasions is unavailable for use by the UE as a result of the base station operating in a full duplex mode. The operations of 1920 may be performed in accordance with examples as disclosed herein. In some examples, aspects of the operations of 1920 may be performed by a RACH manager 1330 as described with reference to FIG. 13.

The following provides an overview of aspects of the present disclosure:

Aspect 1: A method for wireless communication at a UE, comprising: receiving an indication of a plurality of ROs for uplink message transmission to a base station; determining that a first portion of the plurality of ROs is unavailable for use by the UE as a result of the base station operating in a full duplex mode; selecting one or more ROs from a second portion of the plurality of ROs instead of from the first portion based at least in part on the determining; and transmitting a random access message to the base station during the one or more ROs from the second portion.

Aspect 2: The method of aspect 1, wherein determining that the first portion of the plurality of ROs is unavailable further comprises: monitoring for an interference level associated with a second UE transmitting an uplink message to the base station, wherein the monitoring occurs prior to the plurality of ROs.

Aspect 3: The method of aspect 2, wherein monitoring the interference level comprises: monitoring one or more uplink feedback transmissions from the second UE to the base station; and determining the interference level based at least in part on the monitoring.

Aspect 4: The method of aspect 3, wherein determining that the first portion of the plurality of ROs is unavailable further comprises: selecting the one or more ROs from the second portion of the plurality of ROs based at least in part on the interference level satisfying an interference threshold.

Aspect 5: The method of any of aspects 3 through 4, wherein the first portion of the plurality of ROs comprises full-duplex ROs and the second portion of the plurality of ROs comprises half-duplex ROs or the second portion of the plurality of ROs comprises the full-duplex ROs and the half-duplex ROs.

Aspect 6: The method of any of aspects 2 through 5, wherein monitoring the interference level comprises: receiving an indication of a transmission power of the uplink message transmitted by the second UE; determining a pathloss for a channel between the UE and the second UE based at least in part on the uplink message from the second UE to the base station; and identifying the interference level based at least in part on the pathloss.

Aspect 7: The method of any of aspects 2 through 6, wherein monitoring for the interference level comprises: determining a first interference level for a first set of ROs of the plurality of ROs, wherein the first set of ROs is within a first subband; and determining a second interference level for a second set of ROs of the plurality of ROs, wherein the second set of ROs is within a second subband, wherein selecting the one or more ROs from the second portion of the plurality of ROs is based at least in part on at least one of the first interference level or the second interference level, and an interference threshold.

Aspect 8: The method of aspect 7, wherein determining that the first portion of the plurality of ROs is unavailable for use by the UE further comprises: identifying a highest total RSSI per uplink symbol among all uplink symbols within both the first subband and the second subband; comparing the highest total RSSI per uplink symbol from each of the first subband and the second subband with the interference threshold; and determining whether the first set of ROs, the second set of ROs, or both, is unavailable as the first portion of the plurality of ROs or is available as the second portion of the plurality of ROs based at least in part on the comparing.

Aspect 9: The method of any of aspects 1 through 8, wherein determining that the first portion of the plurality of ROs is unavailable further comprises: monitoring each of the plurality of ROs for an interference level, wherein the plurality of ROs are full-duplex ROs.

Aspect 10: The method of aspect 9, wherein the monitoring of each of the plurality of ROs for the interference level comprises: monitoring for a reference signal from the base station, wherein the first portion of ROs have interference levels based on detection of the reference signal during the first portion of ROs, and wherein the second portion of ROs have interference levels based on a lack of detection of the reference signal during the second portion of ROs.

Aspect 11: The method of any of aspects 9 through 10, wherein the first portion of ROs have interference levels above an interference level threshold, and the second portion of ROs have interference levels below the interference level threshold.

Aspect 12: The method of any of aspects 1 through 11, wherein determining that the first portion of the plurality of ROs is unavailable further comprises: receiving a system information message from the base station indicating, for each random access occasion in the plurality of ROs, whether the random access occasion is included in the first portion of the plurality of ROs as unavailable or included in the second portion of the plurality of ROs as available.

Aspect 13: A method for wireless communication at a base station, comprising: transmitting an indication of a plurality of ROs for an uplink message transmission from a UE to the base station; and receiving a random access message from the UE during one or more ROs from a second portion of the plurality of ROs instead of from a first portion of the plurality of ROs, wherein the first portion of the plurality of ROs is unavailable for use by the UE as a result of the base station operating in a full duplex mode.

Aspect 14: The method of aspect 13, further comprising: receiving one or more uplink feedback transmissions from a second UE, wherein the first portion of the plurality of ROs is unavailable for use by the UE based at least in part on an interference level associated with the one or more uplink feedback transmissions satisfying an interference threshold, wherein the one or more uplink feedback transmissions from the second UE occur prior to the plurality of ROs.

Aspect 15: The method of aspect 14, further comprising: transmitting, to the UE, an indication of a transmission power of the one or more uplink feedback transmissions performed by the second UE.

Aspect 16: The method of any of aspects 13 through 15, wherein the first portion of the plurality of ROs comprises full-duplex ROs and the second portion of the plurality of ROs comprises half-duplex ROs or the second portion of the plurality of ROs comprise the full-duplex ROs and the half-duplex ROs.

Aspect 17: The method of any of aspects 13 through 16, further comprising: identifying a downlink transmission from the base station that overlaps in a time domain with a random access occasion of the plurality of ROs; and transmitting a reference signal accompanying the downlink transmission, wherein the plurality of ROs are full-duplex ROs.

Aspect 18: The method of any of aspects 13 through 17, further comprising: identifying one or more downlink transmissions from the base station that overlap in a time domain with a corresponding random access occasion of the plurality of ROs; and transmitting a system information message to the UE indicating, for each random access occasion in the plurality of ROs, whether the random access occasion is included in the first portion of the plurality of ROs as unavailable or included in the second portion of the ROs as available based at least in part on the overlap.

Aspect 19: An apparatus for wireless communication at a UE, comprising a processor; memory coupled with the processor; and instructions stored in the memory and executable by the processor to cause the apparatus to perform a method of any of aspects 1 through 12.

Aspect 20: An apparatus for wireless communication at a UE, comprising at least one means for performing a method of any of aspects 1 through 12.

Aspect 21: A non-transitory computer-readable medium storing code for wireless communication at a UE, the code comprising instructions executable by a processor to perform a method of any of aspects 1 through 12.

Aspect 22: An apparatus for wireless communication at a base station, comprising a processor; memory coupled with the processor; and instructions stored in the memory and executable by the processor to cause the apparatus to perform a method of any of aspects 13 through 18.

Aspect 23: An apparatus for wireless communication at a base station, comprising at least one means for performing a method of any of aspects 13 through 18.

Aspect 24: A non-transitory computer-readable medium storing code for wireless communication at a base station, the code comprising instructions executable by a processor to perform a method of any of aspects 13 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving an indication of a plurality of random access occasions for uplink message transmission to a base station;
   determining that a first portion of the plurality of random access occasions is unavailable for use by the UE as a result of the base station operating in a full duplex mode;
   selecting one or more random access occasions from a second portion of the plurality of random access occasions instead of from the first portion based at least in part on the determining; and
   transmitting a random access message to the base station during the one or more random access occasions from the second portion.

2. The method of claim 1, wherein determining that the first portion of the plurality of random access occasions is unavailable further comprises:
   monitoring for an interference level associated with a second UE transmitting an uplink message to the base station, wherein the monitoring occurs prior to the plurality of random access occasions.

3. The method of claim 2, wherein monitoring the interference level comprises:
   monitoring one or more uplink feedback transmissions from the second UE to the base station; and
   determining the interference level based at least in part on the monitoring.

4. The method of claim 3, wherein determining that the first portion of the plurality of random access occasions is unavailable further comprises:
   selecting the one or more random access occasions from the second portion of the plurality of random access occasions based at least in part on the interference level satisfying an interference threshold.

5. The method of claim 3, wherein the first portion of the plurality of random access occasions comprises full-duplex random access occasions and the second portion of the plurality of random access occasions comprises half-duplex random access occasions or the second portion of the plurality of random access occasions comprises the full-duplex random access occasions and the half-duplex random access occasions.

6. The method of claim 2, wherein monitoring the interference level comprises:
   receiving an indication of a transmission power of the uplink message transmitted by the second UE;
   determining a pathloss for a channel between the UE and the second UE based at least in part on the uplink message from the second UE to the base station; and
   identifying the interference level based at least in part on the pathloss.

7. The method of claim 2, wherein monitoring for the interference level comprises:
   determining a first interference level for a first set of random access occasions of the plurality of random access occasions, wherein the first set of random access occasions is within a first subband; and
   determining a second interference level for a second set of random access occasions of the plurality of random access occasions, wherein the second set of random access occasions is within a second subband, wherein selecting the one or more random access occasions from the second portion of the plurality of random access occasions is based at least in part on at least one of the first interference level or the second interference level, and an interference threshold.

8. The method of claim 7, wherein determining that the first portion of the plurality of random access occasions is unavailable for use by the UE further comprises:
   identifying a highest total received signal strength indication (RSSI) per uplink symbol among all uplink symbols within both the first subband and the second subband;
   comparing the highest total RSSI per uplink symbol from each of the first subband and the second subband with the interference threshold; and
   determining whether the first set of random access occasions, the second set of random access occasions, or both, is unavailable as the first portion of the plurality of random access occasions or is available as the second portion of the plurality of random access occasions based at least in part on the comparing.

9. The method of claim 1, wherein determining that the first portion of the plurality of random access occasions is unavailable further comprises:

monitoring each of the plurality of random access occasions for an interference level, wherein the plurality of random access occasions are full-duplex random access occasions.

10. The method of claim 9, wherein the monitoring of each of the plurality of random access occasions for the interference level comprises:
monitoring for a reference signal from the base station, wherein the first portion of random access occasions have interference levels based on detection of the reference signal during the first portion of random access occasions, and wherein the second portion of random access occasions have interference levels based on a lack of detection of the reference signal during the second portion of random access occasions.

11. The method of claim 9, wherein:
the first portion of random access occasions have interference levels above an interference level threshold, and
the second portion of random access occasions have interference levels below the interference level threshold.

12. The method of claim 1, wherein determining that the first portion of the plurality of random access occasions is unavailable further comprises:
receiving a system information message from the base station indicating, for each random access occasion in the plurality of random access occasions, whether the random access occasion is included in the first portion of the plurality of random access occasions as unavailable or included in the second portion of the plurality of random access occasions as available.

13. A method for wireless communication at a base station, comprising:
transmitting an indication of a plurality of random access occasions for an uplink message transmission from a user equipment (UE) to the base station; and
receiving a random access message from the UE during one or more random access occasions from a second portion of the plurality of random access occasions instead of from a first portion of the plurality of random access occasions, wherein the first portion of the plurality of random access occasions is unavailable for use by the UE as a result of the base station operating in a full duplex mode.

14. The method of claim 13, further comprising:
receiving one or more uplink feedback transmissions from a second UE, wherein the first portion of the plurality of random access occasions is unavailable for use by the UE based at least in part on an interference level associated with the one or more uplink feedback transmissions satisfying an interference threshold, wherein the one or more uplink feedback transmissions from the second UE occur prior to the plurality of random access occasions.

15. The method of claim 14, further comprising:
transmitting, to the UE, an indication of a transmission power of the one or more uplink feedback transmissions performed by the second UE.

16. The method of claim 13, wherein the first portion of the plurality of random access occasions comprises full-duplex random access occasions and the second portion of the plurality of random access occasions comprises half-duplex random access occasions or the second portion of the plurality of random access occasions comprise the full-duplex random access occasions and the half-duplex random access occasions.

17. The method of claim 13, further comprising:
identifying a downlink transmission from the base station that overlaps in a time domain with a random access occasion of the plurality of random access occasions; and
transmitting a reference signal accompanying the downlink transmission, wherein the plurality of random access occasions are full-duplex random access occasions.

18. The method of claim 13, further comprising:
identifying one or more downlink transmissions from the base station that overlap in a time domain with a corresponding random access occasion of the plurality of random access occasions; and
transmitting a system information message to the UE indicating, for each random access occasion in the plurality of random access occasions, whether the random access occasion is included in the first portion of the plurality of random access occasions as unavailable or included in the second portion of the random access occasions as available based at least in part on the overlap.

19. An apparatus for wireless communication at a user equipment (UE), comprising:
a processor;
memory coupled with the processor; and
instructions stored in the memory and executable by the processor to cause the apparatus to:
receive an indication of a plurality of random access occasions for uplink message transmission to a base station;
determine that a first portion of the plurality of random access occasions is unavailable for use by the UE as a result of the base station operating in a full duplex mode;
select one or more random access occasions from a second portion of the plurality of random access occasions instead of from the first portion based at least in part on the determining; and
transmit a random access message to the base station during the one or more random access occasions from the second portion.

20. The apparatus of claim 19, wherein the instructions to determine that the first portion of the plurality of random access occasions is unavailable are further executable by the processor to cause the apparatus to:
monitor for an interference level associated with a second UE transmitting an uplink message to the base station, wherein the monitoring occurs prior to the plurality of random access occasions.

21. The apparatus of claim 20, wherein the instructions to monitor the interference level are executable by the processor to cause the apparatus to:
monitor one or more uplink feedback transmissions from the second UE to the base station; and
determine the interference level based at least in part on the monitoring.

22. The apparatus of claim 21, wherein the instructions to determine that the first portion of the plurality of random access occasions is unavailable are further executable by the processor to cause the apparatus to:
select the one or more random access occasions from the second portion of the plurality of random access occasions based at least in part on the interference level satisfying an interference threshold.

23. The apparatus of claim 21, wherein the first portion of the plurality of random access occasions comprises full-duplex random access occasions and the second portion of the plurality of random access occasions comprises half-duplex random access occasions or the second portion of the plurality of random access occasions comprises the full-duplex random access occasions and the half-duplex random access occasions.

24. The apparatus of claim 20, wherein the instructions to monitor the interference level are executable by the processor to cause the apparatus to:
receive an indication of a transmission power of the uplink message transmitted by the second UE;
determine a pathloss for a channel between the UE and the second UE based at least in part on the uplink message from the second UE to the base station; and
identify the interference level based at least in part on the pathloss.

25. The apparatus of claim 20, wherein the instructions to monitor for the interference level are executable by the processor to cause the apparatus to:
determine a first interference level for a first set of random access occasions of the plurality of random access occasions, wherein the first set of random access occasions is within a first subband; and
determine a second interference level for a second set of random access occasions of the plurality of random access occasions, wherein the second set of random access occasions is within a second subband, wherein selecting the one or more random access occasions from the second portion of the plurality of random access occasions is based at least in part on at least one of the first interference level or the second interference level, and an interference threshold.

26. The apparatus of claim 25, wherein the instructions to determine that the first portion of the plurality of random access occasions is unavailable for use by the UE are further executable by the processor to cause the apparatus to:
identify a highest total received signal strength indication (RSSI) per uplink symbol among all uplink symbols within both the first subband and the second subband;
compare the highest total RSSI per uplink symbol from each of the first subband and the second subband with the interference threshold; and
determine whether the first set of random access occasions, the second set of random access occasions, or both, is unavailable as the first portion of the plurality of random access occasions or is available as the second portion of the plurality of random access occasions based at least in part on the comparing.

27. The apparatus of claim 19, wherein the instructions to determine that the first portion of the plurality of random access occasions is unavailable are further executable by the processor to cause the apparatus to:
monitor each of the plurality of random access occasions for an interference level, wherein the plurality of random access occasions are full-duplex random access occasions.

28. The apparatus of claim 27, wherein the instructions to monitor of each of the plurality of random access occasions for the interference level are executable by the processor to cause the apparatus to:
monitor for a reference signal from the base station, wherein the first portion of random access occasions have interference levels based on detection of the reference signal during the first portion of random access occasions, and wherein the second portion of random access occasions have interference levels based on a lack of detection of the reference signal during the second portion of random access occasions.

29. The apparatus of claim 27, wherein:
the first portion of random access occasions have interference levels above an interference level threshold, and
the second portion of random access occasions have interference levels below the interference level threshold.

30. An apparatus for wireless communication at a base station, comprising:
a processor;
memory coupled with the processor; and
instructions stored in the memory and executable by the processor to cause the apparatus to:
transmit an indication of a plurality of random access occasions for an uplink message transmission from a user equipment (UE) to the base station; and
receive a random access message from the UE during one or more random access occasions from a second portion of the plurality of random access occasions instead of from a first portion of the plurality of random access occasions, wherein the first portion of the plurality of random access occasions is unavailable for use by the UE as a result of the base station operating in a full duplex mode.

* * * * *